(12) United States Patent
Lynn et al.

(10) Patent No.: US 10,509,515 B2
(45) Date of Patent: Dec. 17, 2019

(54) TOUCH INPUT DETECTION WITH SHARED RECEIVERS

(71) Applicant: Sentons Inc., San Jose, CA (US)

(72) Inventors: Lapoe E. Lynn, Los Altos, CA (US); Stanislav Maximov, Mountain View, CA (US)

(73) Assignee: Sentons Inc. (KY)

( * ) Notice: Subject to any disclaimer, the term of this patent is extended or adjusted under 35 U.S.C. 154(b) by 0 days.

(21) Appl. No.: 16/183,992

(22) Filed: Nov. 8, 2018

(65) Prior Publication Data
US 2019/0073089 A1 Mar. 7, 2019

Related U.S. Application Data

(63) Continuation of application No. 15/375,816, filed on Dec. 12, 2016.

(51) Int. Cl.
*G06F 3/043* (2006.01)
*G06F 3/0488* (2013.01)
*G06F 3/041* (2006.01)

(52) U.S. Cl.
CPC .......... *G06F 3/0436* (2013.01); *G06F 3/0414* (2013.01); *G06F 3/0416* (2013.01);
(Continued)

(58) Field of Classification Search
CPC .......... G06F 2203/0339; G06F 3/0488; G06F 3/04886; G06F 2203/033; G06F 3/0436; G06F 3/043; G06F 3/0414; G06F 3/041; G06F 3/03; G06F 3/01; G06F 3/00; G06F 2203/04104; G06F 2203/04105;
(Continued)

(56) References Cited

U.S. PATENT DOCUMENTS

| 3,912,880 A | 10/1975 | Powter |
| 4,488,000 A | 12/1984 | Glenn |

(Continued)

FOREIGN PATENT DOCUMENTS

| CN | 101373415 B | 2/2009 |
| CN | 101669088 B | 3/2010 |

(Continued)

OTHER PUBLICATIONS

Liu et al., 'Acoustic Wave Approach for Multi-Touch Tactile Sensing', Micro-NanoMechatronics and Human Science, 2009. MHS 2009. International Symposium, Nov. 9-11, 2009.
(Continued)

*Primary Examiner* — Julie Anne Watko
(74) *Attorney, Agent, or Firm* — Van Pelt, Yi & James LLP

(57) ABSTRACT

A touch input to a propagating medium is identified based on one or more of the following: (1) a determination that a third propagating signal (from a second transmitter to a first receiver) was interfered with while a first propagating signal (from a first transmitter to the first receiver) was not interfered with or (2) a determination that the second propagating signal (from a first transmitter to a second receiver) was interfered with while the fourth propagating signal (from the second transmitter to the second receiver) was not interfered with. In response to the touch input to the propagating medium being identified, a system which includes the first transmitter, the second transmitter, the first receiver, and the second receiver updates.

20 Claims, 20 Drawing Sheets

Single Touch on the Side of a Phone

(52) U.S. Cl.
CPC ........ *G06F 3/0488* (2013.01); *G06F 3/04886* (2013.01); *G06F 2203/0339* (2013.01); *G06F 2203/04104* (2013.01)

(58) Field of Classification Search
CPC ........... G06F 2203/041; G06F 2203/00; G06F 3/0416; G06F 3/016; G06F 3/0418; G06F 2203/04806; G06F 3/011
See application file for complete search history.

(56) References Cited

U.S. PATENT DOCUMENTS

| | | | |
|---|---|---|---|
| 4,529,959 A | 7/1985 | Ito | |
| 4,594,695 A | 6/1986 | Garconnat | |
| 4,966,150 A | 10/1990 | Etienne | |
| 5,074,152 A | 12/1991 | Ellner | |
| 5,091,406 A | 2/1992 | Toda | |
| 5,233,873 A | 8/1993 | Mozgowiec | |
| 5,334,805 A | 8/1994 | Knowles | |
| 5,451,723 A | 9/1995 | Huang | |
| 5,563,849 A | 10/1996 | Hall | |
| 5,573,077 A | 11/1996 | Knowles | |
| 5,591,945 A | 1/1997 | Kent | |
| 5,635,643 A | 6/1997 | Maji | |
| 5,637,839 A | 6/1997 | Yamaguchi | |
| 5,638,093 A | 6/1997 | Takahashi | |
| 5,708,460 A | 1/1998 | Young | |
| 5,739,479 A | 4/1998 | Davis-Cannon | |
| 5,784,054 A | 7/1998 | Armstrong | |
| 5,854,450 A | 12/1998 | Kent | |
| 5,883,457 A | 3/1999 | Rinde | |
| 5,912,659 A | 6/1999 | Rutledge | |
| 6,091,406 A | 7/2000 | Kambara | |
| 6,211,772 B1 | 4/2001 | Murakami | |
| 6,232,960 B1 | 5/2001 | Goldman | |
| 6,236,391 B1 | 5/2001 | Kent | |
| 6,254,105 B1 | 7/2001 | Rinde | |
| 6,262,946 B1 | 7/2001 | Khuri-Yakub | |
| 6,307,942 B1 | 10/2001 | Azima | |
| 6,473,075 B1 | 10/2002 | Gomes | |
| 6,492,979 B1 | 12/2002 | Kent | |
| 6,498,603 B1 | 12/2002 | Wallace | |
| 6,507,772 B1 | 1/2003 | Gomes | |
| 6,535,147 B1 | 3/2003 | Masters | |
| 6,567,077 B2 | 5/2003 | Inoue | |
| 6,630,929 B1 | 10/2003 | Adler | |
| 6,633,280 B1 | 10/2003 | Matsumoto | |
| 6,636,201 B1 | 10/2003 | Gomes | |
| 6,788,296 B2 | 9/2004 | Ikeda | |
| 6,798,403 B2 | 9/2004 | Kitada | |
| 6,856,259 B1 | 2/2005 | Sharp | |
| 6,891,527 B1 | 5/2005 | Chapman | |
| 6,922,642 B2 | 7/2005 | Sullivan | |
| 6,948,371 B2 | 9/2005 | Tanaka | |
| 7,000,474 B2 | 2/2006 | Kent | |
| 7,006,081 B2 | 2/2006 | Kent | |
| 7,116,315 B2 | 10/2006 | Sharp | |
| 7,119,800 B2 | 10/2006 | Kent | |
| 7,187,369 B1 | 3/2007 | Kanbara | |
| 7,193,617 B1 | 3/2007 | Kanbara | |
| 7,204,148 B2 | 4/2007 | Tanaka | |
| 7,218,248 B2 | 5/2007 | Kong | |
| 7,274,358 B2 | 9/2007 | Kent | |
| RE39,881 E | 10/2007 | Flowers | |
| 7,315,336 B2 | 1/2008 | North | |
| 7,345,677 B2 | 3/2008 | Ing | |
| 7,411,581 B2 | 8/2008 | Hardie-Bick | |
| 7,456,825 B2 | 11/2008 | Kent | |
| 7,511,711 B2 | 3/2009 | Ing | |
| 7,545,365 B2 | 6/2009 | Kent | |
| 7,554,246 B2 | 6/2009 | Maruyama | |
| 7,583,255 B2 | 9/2009 | Ing | |
| 7,649,807 B2 | 1/2010 | Ing | |
| 7,683,894 B2 | 3/2010 | Kent | |
| 7,880,721 B2 | 2/2011 | Suzuki | |
| 7,920,133 B2 | 4/2011 | Tsumura | |
| 8,059,107 B2 | 11/2011 | Hill | |
| 8,085,124 B2 | 12/2011 | Ing | |
| 8,194,051 B2 | 6/2012 | Wu | |
| 8,228,121 B2 | 7/2012 | Benhamouda | |
| 8,237,676 B2 | 8/2012 | Duheille | |
| 8,319,752 B2 | 11/2012 | Hardie-Bick | |
| 8,325,159 B2 | 12/2012 | Kent | |
| 8,358,277 B2 | 1/2013 | Mosby | |
| 8,378,974 B2 | 2/2013 | Aroyan | |
| 8,392,486 B2 | 3/2013 | Ing | |
| 8,418,083 B1 | 4/2013 | Lundy | |
| 8,427,423 B2 | 4/2013 | Tsumura | |
| 8,436,806 B2 | 5/2013 | Almalki | |
| 8,436,808 B2 | 5/2013 | Chapman | |
| 8,493,332 B2 | 7/2013 | D'Souza | |
| 8,519,982 B2 | 8/2013 | Camp, Jr. | |
| 8,576,202 B2 | 11/2013 | Tanaka | |
| 8,619,063 B2 | 12/2013 | Chaine | |
| 8,638,318 B2 | 1/2014 | Gao | |
| 8,648,815 B2 | 2/2014 | Kent | |
| 8,659,579 B2 | 2/2014 | Nadjar | |
| 8,670,290 B2 | 3/2014 | Aklil | |
| 8,681,128 B2 | 3/2014 | Scharff | |
| 8,692,809 B2 | 4/2014 | D'Souza | |
| 8,692,810 B2 | 4/2014 | Ing | |
| 8,692,812 B2 | 4/2014 | Hecht | |
| 8,730,213 B2 | 5/2014 | D'Souza | |
| 8,749,517 B2 | 6/2014 | Aklil | |
| 8,787,599 B2 | 7/2014 | Grattan | |
| 8,791,899 B1 | 7/2014 | Usey | |
| 8,823,685 B2 | 9/2014 | Scharff | |
| 8,854,339 B2 | 10/2014 | Kent | |
| 8,890,852 B2 | 11/2014 | Aroyan | |
| 8,896,429 B2 | 11/2014 | Chaine | |
| 8,896,564 B2 | 11/2014 | Scharff | |
| 8,917,249 B1 | 12/2014 | Buuck | |
| 8,941,624 B2 | 1/2015 | Kent | |
| 8,946,973 B2 | 2/2015 | Pelletier | |
| 8,994,696 B2 | 3/2015 | Berget | |
| 9,030,436 B2 | 5/2015 | Ikeda | |
| 9,041,662 B2 | 5/2015 | Harris | |
| 9,046,959 B2 | 6/2015 | Schevin | |
| 9,046,966 B2 | 6/2015 | D'Souza | |
| 9,058,071 B2 | 6/2015 | Esteve | |
| 9,099,971 B2 | 8/2015 | Lynn | |
| 9,189,109 B2 | 11/2015 | Sheng | |
| 9,250,742 B1 | 2/2016 | Usey | |
| 9,348,468 B2 | 5/2016 | Altekar | |
| 9,477,350 B2 | 10/2016 | Sheng | |
| 9,594,450 B2 | 3/2017 | Lynn | |
| 9,983,718 B2 | 5/2018 | Sheng | |
| 10,209,825 B2 | 2/2019 | Sheng | |
| 2001/0050677 A1 | 12/2001 | Tosaya | |
| 2002/0036621 A1 | 3/2002 | Liu | |
| 2002/0047833 A1 | 4/2002 | Kitada | |
| 2002/0185981 A1 | 12/2002 | Dietz | |
| 2003/0161484 A1 | 8/2003 | Kanamori | |
| 2003/0164820 A1 | 9/2003 | Kent | |
| 2003/0189745 A1 | 10/2003 | Kikuchi | |
| 2003/0197691 A1 | 10/2003 | Fujiwara | |
| 2003/0206162 A1 | 11/2003 | Roberts | |
| 2004/0133366 A1 | 7/2004 | Sullivan | |
| 2004/0160421 A1 | 8/2004 | Sullivan | |
| 2004/0183788 A1 | 9/2004 | Kurashima | |
| 2004/0203594 A1 | 10/2004 | Kotzin | |
| 2004/0239649 A1 | 12/2004 | Ludtke | |
| 2004/0246239 A1 | 12/2004 | Knowles | |
| 2005/0063553 A1 | 3/2005 | Ozawa | |
| 2005/0146511 A1 | 7/2005 | Hill | |
| 2005/0146512 A1 | 7/2005 | Hill | |
| 2005/0174338 A1 | 8/2005 | Ing | |
| 2005/0226455 A1 | 10/2005 | Aubauer | |
| 2005/0229713 A1 | 10/2005 | Niblock | |
| 2005/0248540 A1 | 11/2005 | Newton | |
| 2005/0248547 A1 | 11/2005 | Kent | |
| 2006/0071912 A1 | 4/2006 | Hill | |
| 2006/0109261 A1 | 5/2006 | Chou | |
| 2006/0114233 A1 | 6/2006 | Radivojevic | |

(56) References Cited

U.S. PATENT DOCUMENTS

| | | |
|---|---|---|
| 2006/0139339 A1 | 6/2006 | Pechman |
| 2006/0139340 A1 | 6/2006 | Geaghan |
| 2006/0152499 A1 | 7/2006 | Roberts |
| 2006/0166681 A1 | 7/2006 | Lohbihler |
| 2006/0197753 A1 | 9/2006 | Hotelling |
| 2006/0262104 A1 | 11/2006 | Sullivan |
| 2006/0279548 A1 | 12/2006 | Geaghan |
| 2006/0284841 A1 | 12/2006 | Hong |
| 2007/0019825 A1 | 1/2007 | Marumoto |
| 2007/0109274 A1 | 5/2007 | Reynolds |
| 2007/0165009 A1 | 7/2007 | Sakurai |
| 2007/0171212 A1 | 7/2007 | Sakurai |
| 2007/0183520 A1 | 8/2007 | Kim |
| 2007/0211022 A1 | 9/2007 | Boillot |
| 2007/0214462 A1 | 9/2007 | Boillot |
| 2007/0229479 A1 | 10/2007 | Choo |
| 2007/0240913 A1 | 10/2007 | Schermerhorn |
| 2007/0278896 A1 | 12/2007 | Sarkar |
| 2007/0279398 A1 | 12/2007 | Tsumura |
| 2008/0018618 A1 | 1/2008 | Hill |
| 2008/0030479 A1 | 2/2008 | Lowles |
| 2008/0062151 A1 | 3/2008 | Kent |
| 2008/0081671 A1 | 4/2008 | Wang |
| 2008/0105470 A1 | 5/2008 | Van De Ven |
| 2008/0111788 A1 | 5/2008 | Rosenberg |
| 2008/0169132 A1 | 7/2008 | Ding |
| 2008/0174565 A1 | 7/2008 | Chang |
| 2008/0198145 A1 | 8/2008 | Knowles |
| 2008/0231612 A1 | 9/2008 | Hill |
| 2008/0259030 A1 | 10/2008 | Holtzman |
| 2008/0266266 A1 | 10/2008 | Kent |
| 2008/0284755 A1 | 11/2008 | Hardie-Bick |
| 2009/0009488 A1 | 1/2009 | D'Souza |
| 2009/0103853 A1 | 4/2009 | Daniel |
| 2009/0116661 A1 | 5/2009 | Hetherington |
| 2009/0146533 A1 | 6/2009 | Leskinen |
| 2009/0160728 A1 | 6/2009 | Emrick |
| 2009/0167704 A1 | 7/2009 | Terlizzi |
| 2009/0237372 A1 | 9/2009 | Kim |
| 2009/0271004 A1 | 10/2009 | Zecchin |
| 2009/0273583 A1 | 11/2009 | Norhammar |
| 2009/0309853 A1 | 12/2009 | Hildebrandt |
| 2009/0315848 A1 | 12/2009 | Ku |
| 2010/0026667 A1 | 2/2010 | Bernstein |
| 2010/0027810 A1 | 2/2010 | Marton |
| 2010/0044121 A1 | 2/2010 | Simon |
| 2010/0045635 A1 | 2/2010 | Soo |
| 2010/0079264 A1 | 4/2010 | Hoellwarth |
| 2010/0117933 A1 | 5/2010 | Gothard |
| 2010/0117993 A1 | 5/2010 | Kent |
| 2010/0141408 A1 | 6/2010 | Doy |
| 2010/0156818 A1 | 6/2010 | Burrough |
| 2010/0165215 A1 | 7/2010 | Shim |
| 2010/0185989 A1 | 7/2010 | Shiplacoff |
| 2010/0188356 A1 | 7/2010 | Vu |
| 2010/0245265 A1 | 9/2010 | Sato |
| 2010/0269040 A1 | 10/2010 | Lee |
| 2010/0277431 A1 | 11/2010 | Klinghult |
| 2010/0309139 A1 | 12/2010 | Ng |
| 2010/0315373 A1 | 12/2010 | Steinhauser |
| 2010/0321312 A1 | 12/2010 | Han |
| 2010/0321325 A1 | 12/2010 | Springer |
| 2010/0321337 A1 | 12/2010 | Liao |
| 2011/0001707 A1 | 1/2011 | Faubert |
| 2011/0001708 A1 | 1/2011 | Sleeman |
| 2011/0012717 A1 | 1/2011 | Pance |
| 2011/0013785 A1 | 1/2011 | Kim |
| 2011/0018695 A1 | 1/2011 | Bells |
| 2011/0025649 A1 | 2/2011 | Sheikhzadeh Nadjar |
| 2011/0042152 A1 | 2/2011 | Wu |
| 2011/0057903 A1 | 3/2011 | Yamano |
| 2011/0063228 A1 | 3/2011 | St Pierre |
| 2011/0080350 A1 | 4/2011 | Almalki |
| 2011/0084912 A1 | 4/2011 | Almalki |
| 2011/0084937 A1 | 4/2011 | Chang |
| 2011/0155479 A1 | 6/2011 | Oda |
| 2011/0156967 A1 | 6/2011 | Oh |
| 2011/0167391 A1 | 7/2011 | Momeyer |
| 2011/0175813 A1 | 7/2011 | Sarwar |
| 2011/0182443 A1 | 7/2011 | Gant |
| 2011/0191680 A1 | 8/2011 | Chae |
| 2011/0199342 A1 | 8/2011 | Vartanian |
| 2011/0213223 A1 | 9/2011 | Kruglick |
| 2011/0222372 A1 | 9/2011 | O'Donovan |
| 2011/0225549 A1 | 9/2011 | Kim |
| 2011/0234545 A1 | 9/2011 | Tanaka |
| 2011/0260988 A1 | 10/2011 | Colgate |
| 2011/0260990 A1 | 10/2011 | Ali |
| 2011/0279382 A1 | 11/2011 | Pertuit |
| 2011/0298670 A1 | 12/2011 | Jung |
| 2011/0300845 A1 | 12/2011 | Lee |
| 2011/0304577 A1 | 12/2011 | Brown |
| 2011/0316784 A1 | 12/2011 | Bisutti |
| 2011/0316790 A1 | 12/2011 | Ollila |
| 2012/0001875 A1 | 1/2012 | Li |
| 2012/0002820 A1 | 1/2012 | Leichter |
| 2012/0007837 A1 | 1/2012 | Kent |
| 2012/0026114 A1 | 2/2012 | Lee |
| 2012/0030628 A1 | 2/2012 | Lee |
| 2012/0032928 A1 | 2/2012 | Alberth |
| 2012/0050230 A1 | 3/2012 | Harris |
| 2012/0062564 A1 | 3/2012 | Miyashita |
| 2012/0068939 A1 | 3/2012 | Pemberton-Pigott |
| 2012/0068970 A1 | 3/2012 | Pemberton-Pigott |
| 2012/0081337 A1 | 4/2012 | Camp, Jr. |
| 2012/0088548 A1 | 4/2012 | Yun |
| 2012/0092964 A1 | 4/2012 | Badiey |
| 2012/0120031 A1 | 5/2012 | Thuillier |
| 2012/0126962 A1 | 5/2012 | Ujii |
| 2012/0127088 A1 | 5/2012 | Pance |
| 2012/0140954 A1 | 6/2012 | Ranta |
| 2012/0144293 A1 | 6/2012 | Kim |
| 2012/0149437 A1 | 6/2012 | Zurek |
| 2012/0188194 A1 | 7/2012 | Sulem |
| 2012/0188889 A1 | 7/2012 | Sambhwani |
| 2012/0194466 A1 | 8/2012 | Posamentier |
| 2012/0200517 A1 | 8/2012 | Nikolovski |
| 2012/0206154 A1 | 8/2012 | Pant |
| 2012/0229407 A1 | 9/2012 | Harris |
| 2012/0232834 A1 | 9/2012 | Roche |
| 2012/0235866 A1 | 9/2012 | Kim |
| 2012/0242603 A1 | 9/2012 | Engelhardt |
| 2012/0270605 A1 | 10/2012 | Garrone |
| 2012/0272089 A1 | 10/2012 | Hatfield |
| 2012/0278490 A1 | 11/2012 | Sennett |
| 2012/0282944 A1 | 11/2012 | Zhao |
| 2012/0300956 A1 | 11/2012 | Horii |
| 2012/0306823 A1 | 12/2012 | Pance |
| 2013/0011144 A1 | 1/2013 | Amiri Farahani |
| 2013/0050133 A1 | 2/2013 | Brakensiek |
| 2013/0050154 A1 | 2/2013 | Guy |
| 2013/0057491 A1 | 3/2013 | Chu |
| 2013/0059532 A1 | 3/2013 | Mahanfar |
| 2013/0082970 A1 | 4/2013 | Frey |
| 2013/0127755 A1 | 5/2013 | Lynn |
| 2013/0141365 A1 | 6/2013 | Lynn |
| 2013/0147768 A1 | 6/2013 | Aroyan |
| 2013/0194208 A1 | 8/2013 | Miyanaka |
| 2013/0222274 A1 | 8/2013 | Mori |
| 2013/0234995 A1 | 9/2013 | Son |
| 2013/0249831 A1 | 9/2013 | Harris |
| 2014/0028576 A1 | 1/2014 | Shahparnia |
| 2014/0078070 A1 | 3/2014 | Armstrong-Muntner |
| 2014/0078086 A1 | 3/2014 | Bledsoe |
| 2014/0078109 A1 | 3/2014 | Armstrong-Muntner |
| 2014/0078112 A1 | 3/2014 | Sheng |
| 2014/0185834 A1 | 7/2014 | Frömel |
| 2014/0247230 A1 | 9/2014 | Sheng |
| 2014/0247250 A1 | 9/2014 | Sheng |
| 2014/0317722 A1 | 10/2014 | Tartz |
| 2014/0362055 A1 | 12/2014 | Altekar |
| 2014/0368464 A1 | 12/2014 | Singnurkar |
| 2015/0002415 A1 | 1/2015 | Lee |
| 2015/0009185 A1 | 1/2015 | Shi |

(56) References Cited

U.S. PATENT DOCUMENTS

| | | |
|---|---|---|
| 2015/0109239 A1 | 4/2015 | Mao |
| 2015/0199035 A1 | 7/2015 | Chang |
| 2015/0253895 A1 | 9/2015 | Kim |
| 2015/0346850 A1 | 12/2015 | Vandermeijden |
| 2015/0366504 A1 | 12/2015 | Connor |
| 2016/0070404 A1 | 3/2016 | Kerr |
| 2016/0091308 A1 | 3/2016 | Oliaei |
| 2016/0162044 A1 | 6/2016 | Ciou |
| 2016/0179249 A1 | 6/2016 | Ballan |
| 2016/0209944 A1 | 7/2016 | Shim |
| 2016/0282312 A1 | 9/2016 | Cable |
| 2016/0282965 A1 | 9/2016 | Jensen |
| 2016/0349913 A1 | 12/2016 | Lynn |
| 2016/0349922 A1 | 12/2016 | Choi |
| 2017/0010697 A1 | 1/2017 | Jiang |
| 2017/0020402 A1 | 1/2017 | Rogers |
| 2017/0083164 A1 | 3/2017 | Sheng |
| 2018/0032211 A1 | 2/2018 | King |

FOREIGN PATENT DOCUMENTS

| | | |
|---|---|---|
| CN | 103677339 | 7/2017 |
| EP | 2315101 A1 | 4/2011 |
| EP | 2315101 B1 | 1/2014 |
| FR | 2948787 B1 | 2/2011 |
| JP | H07160355 | 6/1995 |
| JP | 2005092527 A | 4/2005 |
| JP | 5723499 | 5/2015 |
| KR | 20040017272 | 2/2004 |
| KR | 20070005580 | 1/2007 |
| KR | 20080005990 | 1/2008 |
| KR | 20110001839 | 1/2011 |
| WO | 03005292 A1 | 1/2003 |
| WO | 2006131022 A1 | 12/2006 |
| WO | 2006115947 A3 | 6/2007 |
| WO | 2009028680 A1 | 3/2009 |
| WO | 2011010037 A1 | 1/2011 |
| WO | 2011024434 | 3/2011 |
| WO | 2011048433 A1 | 4/2011 |
| WO | 2011051722 | 5/2011 |
| WO | 2012010912 A2 | 1/2012 |
| WO | 2014066621 | 6/2014 |
| WO | 2014209757 A1 | 12/2014 |
| WO | 2015027017 | 2/2015 |
| WO | 2015127167 | 8/2015 |

OTHER PUBLICATIONS

T Benedict et al. 'The joint estimation of signal and noise from the sum envelope.' IEEE Transactions on Information Theory 13.3, pp. 447-454. Jul. 1, 1967.

No Touch Applied

Single Touch on the Side of a Phone

— Signal between one TX/RX pair with no touch

---- Signal between one TX/RX pair with light touch

........ Signal between one TX/RX pair with heavy touch

TOUCH INPUT DETECTION WITH SHARED RECEIVERS

CROSS REFERENCE TO OTHER APPLICATIONS

This application is a continuation of co-pending U.S. patent application Ser. No. 15/375,816 entitled TOUCH INPUT DETECTION WITH SHARED RECEIVERS filed Dec. 12, 2016 which is incorporated herein by reference for all purposes.

BACKGROUND OF THE INVENTION

Current touch and force sensors (which detect where/ when a touch is applied to a surface and an amount of force applied, respectively) are less than ideal. Some types of existing sensors rely upon capacitive-based techniques. This is undesirable because the capacitors involved are difficult and expensive to manufacture and test (e.g., because of the tiny air gap required between the two surfaces of the capacitor). Capacitive-based touch surfaces also have a "squishy" sensation, which some users may find unpleasant. New touch and/or force sensing techniques which do not rely upon capacitors would be desirable. Furthermore, it would be desirable if such new techniques worked with materials which in the past have not worked well with capacitive-based sensing (e.g., metal, which because of its stiffness and/or conductive properties does not work well with existing capacitive-based sensors).

BRIEF DESCRIPTION OF THE DRAWINGS

Various embodiments of the invention are disclosed in the following detailed description and the accompanying drawings.

DETAILED DESCRIPTION

Figure 1A:
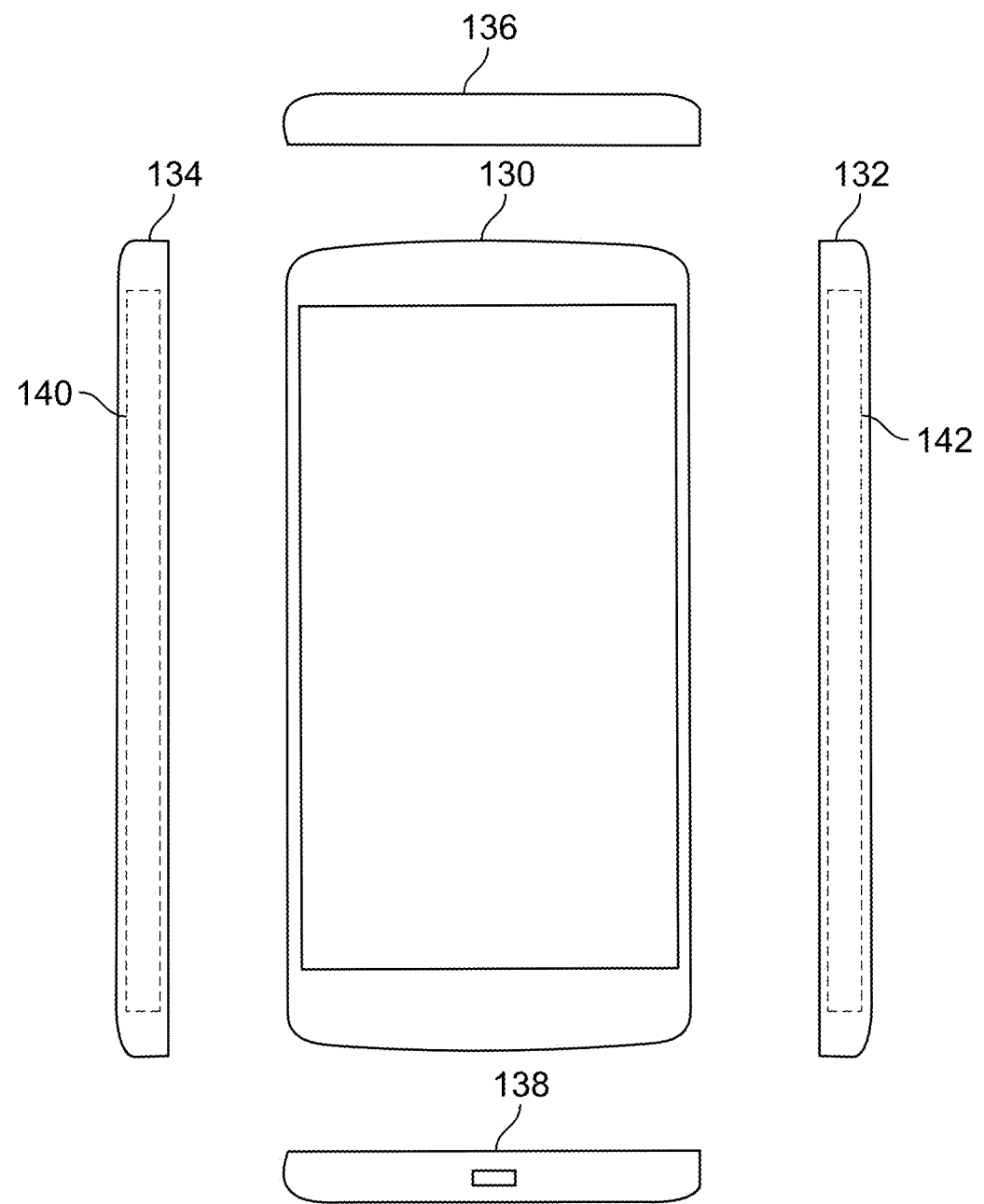
FIG. 1A is a diagram illustrating different views of a device with touch input enabled housing.

The invention can be implemented in numerous ways, including as a process; an apparatus; a system; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of touch and/or force sensing using shared receivers are described herein. In these shared receiver embodiments, a given receiver listens to or for multiple transmitters. This reduces the total number of receivers which in turn reduces cost and/or area associated with routing (e.g., on a printed circuit board) because routing associated with receivers is relatively expensive (e.g., compared to transmitters). Also, in some examples described below, the transmitters and receivers exchange ultrasonic signals which propagate easily through metal (e.g., which other types of touch and/or force sensors have had difficulty working in).

In some embodiments, a plurality of transmitters are coupled to a propagating housing medium and each transmitter is configured to emit a propagating signal through the propagating housing medium. A plurality of receivers are coupled to the propagating housing medium, wherein the receivers detect the propagating signals that have been disturbed by a touch input. The plurality of transmitters and the plurality of receivers are coupled to the propagating medium inline along a one-dimensional axis (e.g., lengthwise) of the propagating housing medium (at least in some embodiments). For example, when the propagating housing medium is touched at a point along the one-dimensional axis, the emitted signal propagating through the propagating housing medium is disturbed (e.g., the touch causes an interference with the propagated signal). By processing the received signals, a location and a force on the surface of the housing associated with the touch input are at least in part identified. Because the interaction between the material of the touch input and the propagated signal is utilized to detect the signal, a mechanical deflection of a sensor is not required to detect either the location or the force of the touch input. For example, the location and the force of a touch input are able to be detected on a rigid metal side of a smartphone without a use of a physical button or a physical strain gauge.

The one-dimensional axis (e.g., associated with a medium through which signals are transmitted and received) is not necessarily limited to plane geometry. In various embodiments, any straight line on a sphere, cylinder, or any other curved surface as a shortest path between two points on the surface, also known as a geodesic, comprises the one-dimensional axis associated with the medium.

In various embodiments, the touch input includes a physical contact to a surface using a human finger, pen, pointer, stylus, and/or any other body parts or objects that can be used to contact or disturb the surface. In some embodiments, the touch input includes an input gesture and/or a multi-touch input. In some embodiments, the received signal is used to determine one or more of the following associated with a touch input: a gesture, a coordinate position, a time, a time frame, a direction, a velocity, a force magnitude, a proximity magnitude, a pressure, a size, and other measurable or derived parameters.

Touch input detection described herein may be utilized to detect touch inputs on non-traditional surfaces such as metal that allows it to have applicability beyond touch screen displays. Various technologies have been traditionally used to detect a touch input on a display area. The most popular technologies today include capacitive and resistive touch detection technology. Using resistive touch technology, often a glass panel is coated with multiple conductive layers that register touches when physical pressure is applied to the layers to force the layers to make physical contact. Using capacitive touch technology, often a glass panel is coated with material that can hold an electrical charge sensitive to a human finger. By detecting the change in the electrical charge due to a touch, a touch location can be detected. However, with resistive and capacitive touch detection technologies, the glass screen is required to be coated with a material that reduces the clarity of the glass screen. Additionally, because the entire glass screen is required to be coated with a material, manufacturing and component costs can become prohibitively expensive as larger screens are desired.

Another type of touch detection technology includes bending wave technology. One example includes the Elo Touch Systems Acoustic Pulse Recognition, commonly called APR, manufactured by Elo Touch Systems of 301 Constitution Drive, Menlo Park, Calif. 94025. The APR system includes transducers attached to the edges of a touchscreen glass that pick up the sound emitted on the glass due to a touch. However, the surface glass may pick up other external sounds and vibrations that reduce the accuracy and effectiveness of the APR system to efficiently detect a touch input. Another example includes the Surface Acoustic Wave-based technology, commonly called SAW, such as the Elo IntelliTouch Plus™ of Elo Touch Systems. The SAW technology sends ultrasonic waves in a guided pattern using reflectors on the surface of the touch screen to detect a touch. However, sending the ultrasonic waves in the guided pattern increases costs and may be difficult to achieve. Additionally, because SAW must propagate on the surface, SAW transmitters and receivers are typically mounted on the same surface where a touch input is to be received. Detecting additional types of inputs, such as multi-touch inputs, may not be possible or may be difficult using SAW or APR technology.

FIG. 1A is a diagram illustrating different views of a device with touch input enabled housing. Front view 130 of the device shows a front display surface of the device. Left side view 134 of the device shows an example touch input external surface region 140 on a sidewall of the device where a touch input is able to be detected. For example, a location and a force of a user touch input are able to be detected in region 140 by detecting disturbances to transmitted signals in region 140. By touch enabling the side of the device, one or more functions traditionally served by physical buttons are able to be provided without the use of physical buttons. For example, volume control inputs are able to be detected on the side without the use of physical volume control buttons. Right side view 132 of the device shows touch input external surface region 142 on another sidewall of the device where a user touch input can be detected. Although regions 140 and 142 have been shown as smooth regions, in various other embodiments one or more physical buttons, ports, and/or openings (e.g., SIM/memory card tray) may exist, or the region can be textured to provide an indication of the sensing region. Touch input detection may be provided over surfaces of physical buttons, trays, flaps, switches, etc. by detecting transmitted signal disturbances to allow touch input detection without requiring detection of physical movement/deflection of a component of the device (e.g., detect finger swiping over a surface of a physical button). In some embodiments, the touch input regions on the sides may be divided into different regions that correspond to different functions. The touch input provided in region 140 (and likewise in region 142) is detected along a one-dimensional axis. For example, a touch location is detected as a position on its lengthwise axis without differentiating the width of the object touching the sensing region. In an alternative embodiment, the width of the object touching the sensing region is also detected. Regions 140 and 142 correspond to regions beneath which touch input transmitters and sensors are located. Although two touch input regions on the housing of the device have been shown in FIG. 1A, other touch input regions on the housing may exist in various other embodiments. For example, surfaces on top (e.g., surface on top view 136)

and/or bottom (e.g., surface on bottom view 138) of the device are touch input enabled. The shapes of touch input surfaces/regions on device sidewalls (e.g., regions 140 and 142) may be at least in part flat, at least in part curved, at least in part angular, at least in part textured, and/or any combination thereof.

Figure 1B:
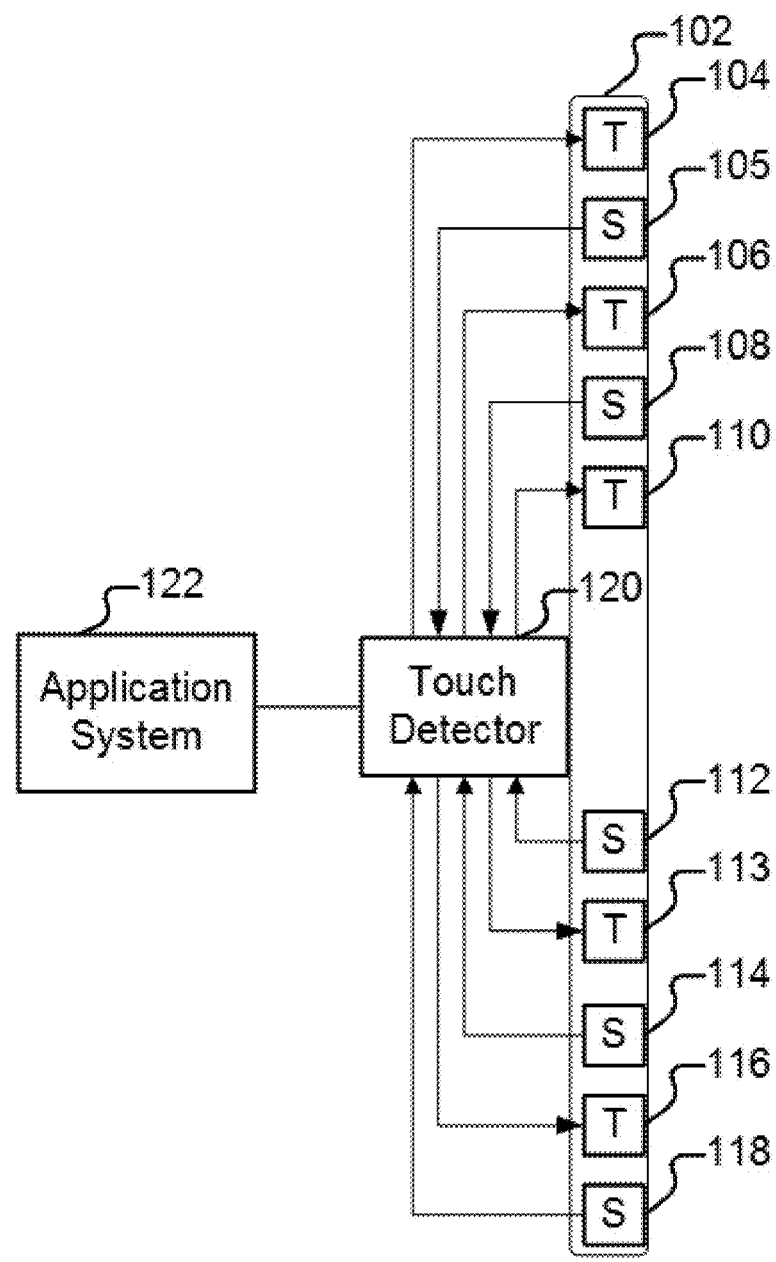
FIG. 1B is a block diagram illustrating an embodiment of a system for detecting a touch input surface disturbance.

FIG. 1B is a block diagram illustrating an embodiment of a system for detecting a touch input surface disturbance. In some embodiments, the system shown in FIG. 1B is included in the device shown in FIG. 1A. For example, FIG. 1B shows components utilized to detect a touch input on a sidewall external surface 140 of FIG. 1A. In some embodiments, the system shown in FIG. 1B is included in a computing device, an entertainment device, a smartphone, a tablet computer, a point of sale terminal, a food and restaurant apparatus, a gaming device, a casino game and application, a piece of furniture, a vehicle, an industrial application, a financial application, a medical device, an appliance, and any other objects or devices having a touch input surface. Propagating signal medium 102 is coupled to transmitters 104, 113, 106, 116, and 110 and receivers/sensors 105, 108, 112, 114 and 118. The locations where transmitters 104, 113, 106, 116, and 110 and sensors 105, 108, 112, 114 and 118 are located with respect to propagating signal medium 102 and with respect to each other, as shown in FIG. 1B, are merely an example. Likewise, the number of transmitters and receivers need not be equal. In some embodiments, propagating signal medium 102 is a part of a housing of a device. For example, the transmitter and receivers are coupled to a sidewall of a housing of a smartphone device to detect touch inputs on the side of the device. In some embodiments, the shown portion of propagating signal medium 102 corresponds to touch input region 140 of FIG. 1A. For example, the shown elongated region of medium 102 corresponds to a region of a side of a smartphone device where touch input is able to be provided.

Other configurations of transmitter and sensor locations may exist in various embodiments. Although FIG. 1B shows alternating transmitters and receivers arranged inline, locations of transmitters and sensors may be intertwined and spaced and arranged in any configuration in various other embodiments. The gap between transmitter 110 and sensor 112 may correspond to a location where a SIM/memory card opening is to be located. Any number of transmitters and/or sensors may be utilized in various embodiments. In some embodiments, rather than using a dedicated transmitter and a dedicated sensor, a transducer that acts as both a transmitter and a sensor is utilized. In various embodiments, the propagating medium includes one or more of the following materials: polymer, plastic, wood, steel, metal and any medium that is able to propagate an acoustic or ultrasonic signal. For example, medium 102 is a portion of a metal sidewall/side-edge of a smartphone or a tablet computer device where a user is to hold the device. FIG. 1B only shows transmitters and sensors for one side of a device as an example and another set of transmitters and sensors may be placed on another side of the device to detect inputs on this other side of the device (e.g., also connected to touch detector 120). Objects of FIG. 1B are not drawn to scale.

Medium 102 includes a surface area where a user may touch to provide a command input. In various embodiments, the touch input surface of medium 102 is flat, curved, or combinations thereof. The touch input is to be detected along a lengthwise region (e.g., locations in the region to be only identified along a one-dimensional axis). A one-dimensional location and a force of a touch input along an external sidewall surface of the device may be detected without actuation of a physical button or use of any other sensor that requires a physical deflection/movement of a component of the device. For example, a user provides an input on the external surface of medium 102 that covers the shown transmitters and receivers that are mounted on an opposite internal surface/side of medium 102 (e.g., mounted on an internal side of device sidewall inside a device and the touch input is provided on the other side of the device sidewall that is the external surface of the device sidewall) and the input disturbs a transmitted signal traveling within medium 102 (e.g., by at least one of the shown transmitters) that is detected (e.g., by at least one of the shown sensors) and analyzed to identify a location on the external surface of medium 102 where the input was provided. This allows virtual buttons to be provided on a smooth side surface and an indication of a virtual button press is detected when a user applies pressure of sufficient force at a specific location of a virtual button on the side surface region. In some embodiments, a length of the axis where a touch input is able to be detected starts from an external surface over a mounting location of transmitter 104 to an external surface over a mounting location of sensor 118.

Examples of transmitters 104, 106, 110, 113 and 116 include piezoelectric transducers, electromagnetic transducers, transmitters, sensors, and/or any other transmitters and transducers capable of propagating a signal through medium 102. Examples of sensors 105, 108, 112, 114 and 118 include piezoelectric transducers, electromagnetic transducers, laser vibrometer transmitters, and/or any other sensors and transducers capable of detecting a signal on medium 102. Although five transmitters and five sensors are shown, any number of transmitters and any number of sensors may be used in other embodiments. In the example shown, transmitters 104, 106, 110, 113 and 116 each may propagate a signal through medium 102. A signal emitted by a transmitter is distinguishable from another signal emitted by another transmitter. In order to distinguish the signals, a phase of the signals (e.g., code division multiplexing), a frequency range of the signals (e.g., frequency division multiplexing), or a timing of the signals (e.g., time division multiplexing) may be varied. One or more of sensors 105, 108, 112, 114 and 118 receive the propagated signals.

Touch detector 120 (e.g., included and mounted on an internal circuit board) is connected to at least the transmitters and sensors shown in FIG. 1B. In some embodiments, detector 120 includes one or more of the following: an integrated circuit chip, a printed circuit board, a processor, and other electrical components and connectors. Detector 120 determines and sends signals to be propagated by transmitters 104, 106, 110, 113 and 116. Detector 120 also receives the signals detected by sensors 105, 108, 112, 114 and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a location identifier and a force identifier associated with a user touch input that is used by application system 122 to control configuration, setting or function of a device, operating system and/or application of application system 122. For example, a user indication to increase volume is detected when a touch input of sufficient pressure is detected within one range of locations along a one-dimensional axis, while a user indication to decrease volume is detected when an input of sufficient pressure is detected within another range of locations. Such regions can be fixed, or can be defined in software. For example, a right-handed user could have a region to change volume assigned to the detection region on the left side of the case, whereas a left-handed user could reverse this assignment.

In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate along a one-dimensional axis, a gesture, simultaneous user indications (e.g., multi-touch input), a time, a status, a direction, a velocity, a force magnitude, a proximity magnitude, a pressure, a size, and other measurable or derived information.

Figure 1C:
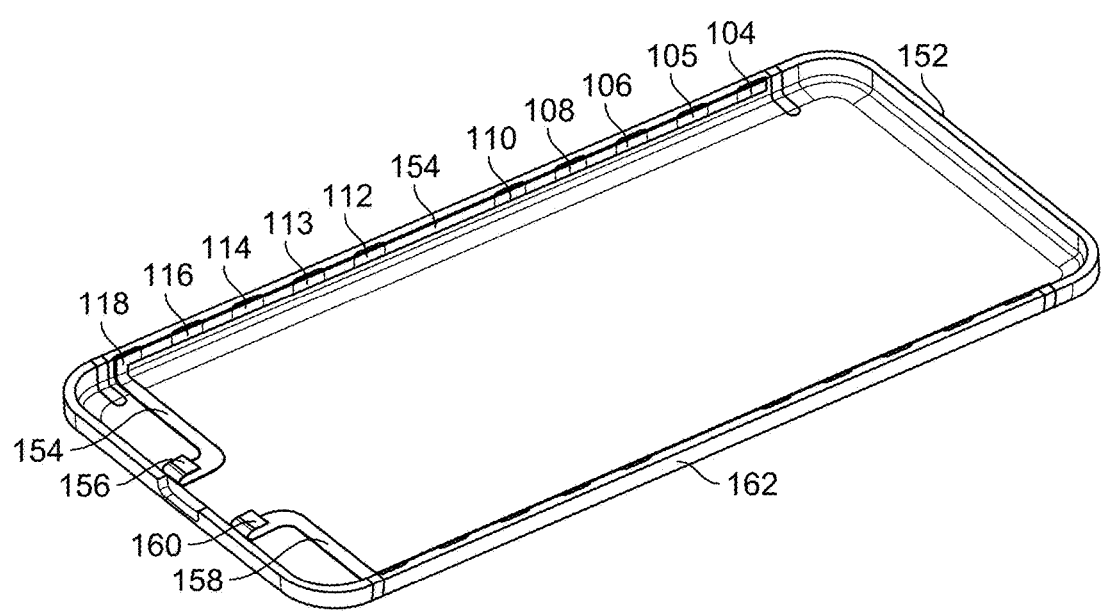
FIG. 1C is a diagram illustrating an embodiment of a device housing with touch input enabled sides.

FIG. 1C is a diagram illustrating an embodiment of a device housing with touch input enabled sides. Housing 152 shows a unibody back and side housing of an electronic device. For example, housing 152 may be utilized as a part of a housing for a smartphone device that houses electrical components and is covered with a display glass surface. Transmitters 104, 106, 110, 113 and 116 and sensors 105, 108, 112, 114 and 118 (also shown in FIG. 1B) have been mounted on an internal side/surface of a sidewall (e.g., sidewall internal surface/side facing inside the electronic device) of housing 152. Housing 152 may be made of metal (e.g., aluminum), plastics, ceramics, carbon fiber, or any other material of propagating medium 102 of FIG. 1B. The transmitters and sensors are mounted on flex cable 154. Flex cable 154 includes patterned conductors that connect the transmitters and sensors/receivers to pins on connector 156. In some embodiments, connector 156 connects to a circuit board (not shown) that includes a touch detector (e.g., touch detector 120) that provides/receives signals to/from the transmitters/receivers. The transmitters and sensors/receivers of flex cable 154 are utilized to detect touch input on an external side surface of housing 152 over the region directly above and between the transmitters and sensors/receivers of flex cable 154 (e.g., to detect location and force along a one-dimensional axis identifying lengthwise locations on the external side surface). This allows the side surface of housing 152 to be touch sensitive to user inputs. Although housing 152 does not show any physical buttons in the touch input surface, in various other embodiments, one or more physical buttons may exist. For example, touch input detection may be provided on a surface of a physical button (e.g., transmitter/sensor mounted behind/around a physical button) to allow a user to provide a touch indication over a surface of a physical button without physically actuating the physical button (e.g., detect swipe gesture over physical button).

Much like flex cable 154, flex cable 158 connects transmitters and sensors mounted on a second internal surface/side of a second sidewall (e.g., sidewall internal surface/side facing inside cavity of the electronic device) to connector 160 (e.g., connects to the circuit board that includes touch detector 120 of FIG. 1B). The transmitters and sensors/receivers of flex cable 158 are utilized to detect touch input on external side surface 162 of housing 152 over the region directly above and between the transmitters and sensors/receivers of flex cable 158. This allows sidewall surface 162 to be touch sensitive to user inputs. In various embodiments, other transmitters and sensors/receivers may be mounted on other internal walls and surfaces of housing 152 to allow touch inputs on other external surfaces of housing 152.

Figure 1D:
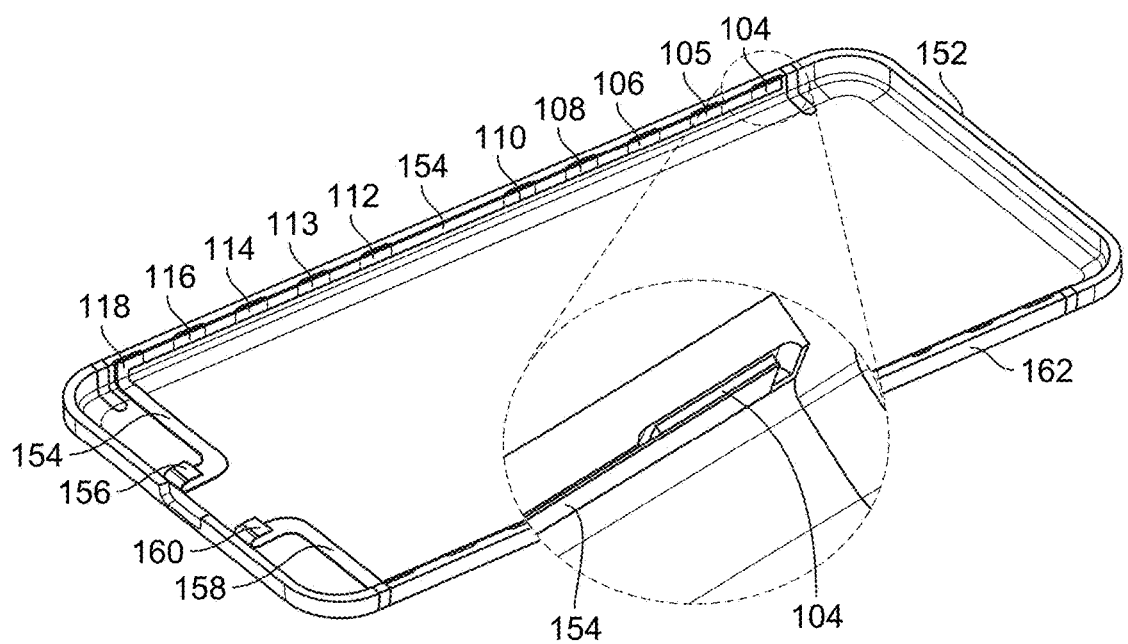
FIG. 1D shows a magnified view of the cavity/pocket.
Figure 1E:
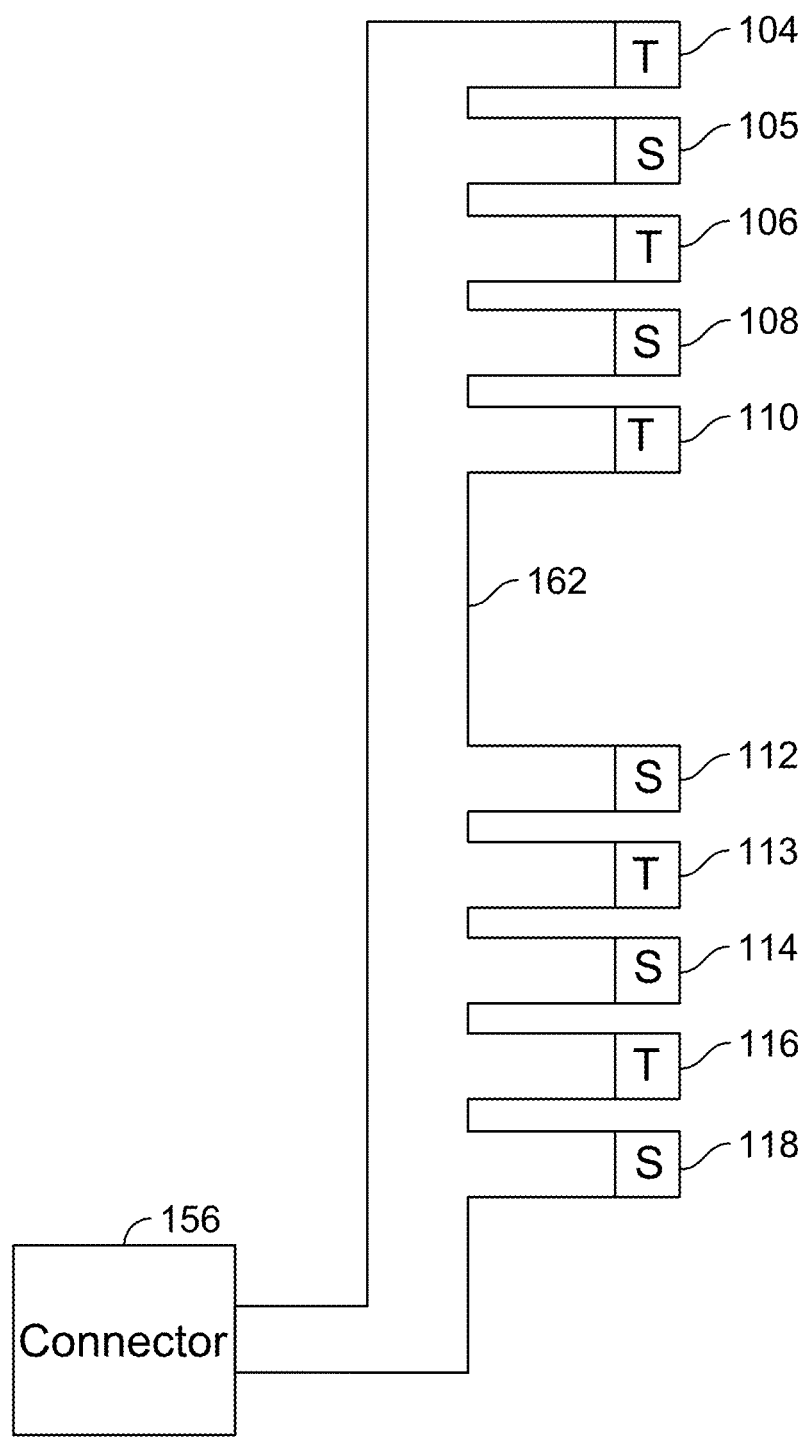
FIG. 1E shows transmitters and receivers mounted on fingers of a flex cable.

Although the shown transmitters and sensors/receivers have been directly mounted on flex cable 154 in a straight line along a strip/bar of flex cable 154, the sensors/receivers and transmitters may be mounted on a flex cable in various other embodiments. For example, FIG. 1E shows transmitters and receivers mounted on fingers of flex cable 162. This may allow flexibility in routing the flex cable around other internal components of a device. For example, the fingers allow the flex cable to be routed around openings and components to accommodate a switch, button, SIM/memory card tray, etc.

When manufacturing the configuration shown in FIG. 1C, it may be inefficient to individually attach each individual transmitter/sensor onto a flex cable. In some embodiments, transmitters and sensors are positioned/placed on a stiffener bar (e.g., mounting template bar) that assists in the positioning and alignment of the transmitters and sensors and all of the transmitters and sensors on the stiffener bar are attached to a flex cable together at the same time using the stiffener bar. Once transmitters/sensors are attached to the flex cable, each of the transmitters/sensors on the flex cable are attached to the propagating medium/housing via an adhesive (e.g., epoxy). The transmitters and sensors shown in the example of FIG. 1C have been placed inside cavities/pockets etched on the internal side/surface of sidewall of housing 152. FIG. 1D shows a magnified view of the cavity/pocket (e.g., 0.3 millimeter in depth). By placing each transmitter/sensor in the cavity, valuable internal space inside the housing is maintained and the flex cable assembly with the transmitters and receivers is able to be mounted flush to the sidewall.

Figure 1F:
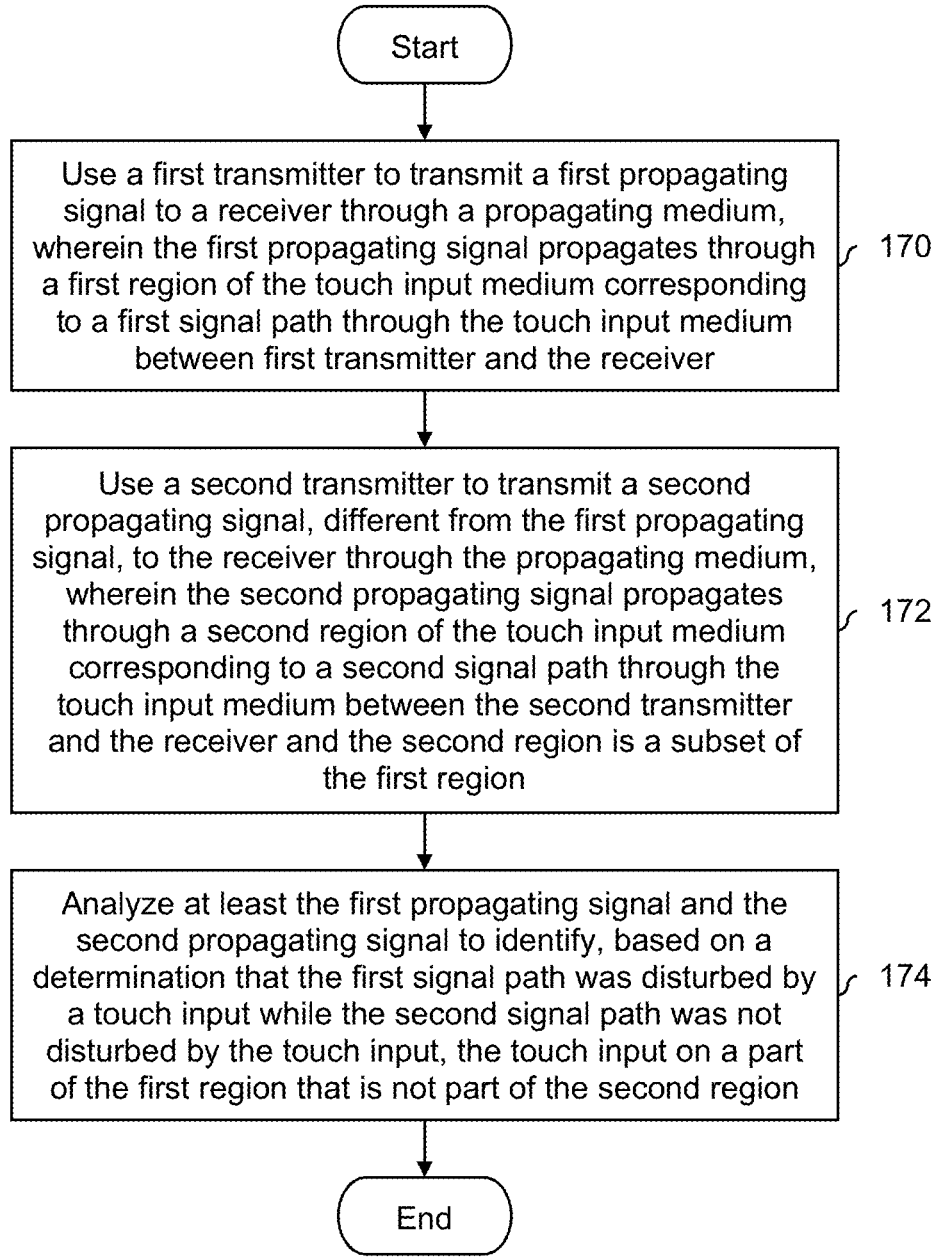
FIG. 1F is a flowchart illustrating an embodiment of a process to detect a touch input.

FIG. 1F is a flowchart illustrating an embodiment of a process to detect a touch input. In one example of a system which performs the process of FIG. 1F, the first transmitter, the second transmitter, and the receiver are embedded in the side of a phone. A touch and/or force sensor (e.g., implemented on some type of processor, such as an application-specific integrated circuit (ASIC), a field-programmable gate array (FPGA), or a general purpose processor) in the phone inputs a received signal which is output by the receiver and includes propagating signals from the transmitters. The touch and/or force sensor analyzes the received signal to identify touches and/or estimate a force value for any identified touches.

At 170, a first transmitter is used to transmit a first propagating signal to a receiver through a propagating medium, wherein the first propagating signal propagates through a first region of the touch input medium corresponding to a first signal path through the touch input medium between the first transmitter and the receiver. As will be described in more detail below, in some embodiments, transmitters and receivers exchange acoustic or ultrasonic signals. In some embodiments, the propagating medium is substantially linear or one-dimensional, and the transmitters and receivers are arranged in a line within the 1D propagating medium (e.g., along the side of a phone).

At 172, a second transmitter is used to transmit a second propagating signal, different from the first propagating signal, to the receiver through the propagating medium, wherein the second propagating signal propagates through a second region of the touch input medium corresponding to a second signal path through the touch input medium between the second transmitter and the receiver and the second region is a subset of the first region. For example, the second transmitter may sit between the first transmitter and the receiver in a line, such that the second region (e.g., through which the second propagating signal propagates) is a subset of the first region (e.g., through which the first propagating signal propagates).

At 174, at least the first propagating signal and the second propagating signal are analyzed to identify, based on a determination that the first signal path was disturbed by a touch input while the second signal path was not disturbed by the touch input, the touch input on a part of the first region that is not part of the second region. As will be described in more detail below, if the first signal passes through the touch input while the second signal does not (e.g., where the touch or lack thereof is indicated by the amplitude of the signals), that is indicative of a touch in the part of the first region which is not part of the second region.

It is noted that the process of FIG. 1F not only identifies when a touch has occurred, but the location of that touch is also determined or otherwise identified. For example, since the positions of the various transmitters and receivers are known, the presence of a touch between two adjacent transmitters and/or receivers corresponds to knowing the position of that touch (e.g., where that touch occurs on the side of a smartphone or tablet). In some embodiments, the process of FIG. 1F identifies multiple touch inputs which occur simultaneously on the interactive surface (e.g., so that the locations of multiple touches is/are identified). This is desirable because applications which require multiple, simultaneous touch inputs can be supported.

In some embodiments, a force value is determined for each detected or identified touch. For example, if a sensor identifies two touches, the sensor may also estimate a force value for each identified touch (e.g., where the two force values are permitted to be different values).

The following figure shows an example of two transmitters and a receiver which are embedded in the side of a phone and which exchange the signals described and/or used above.

Figure 2A:
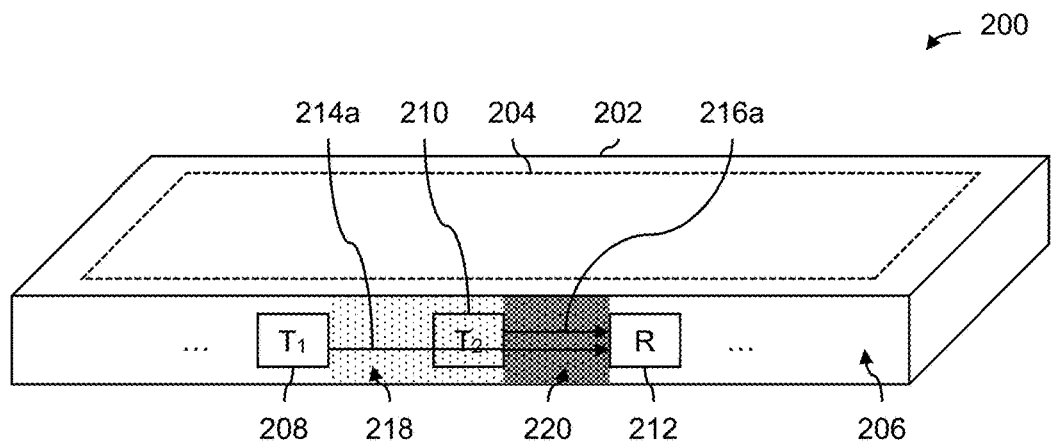
FIG. 2A is a diagram illustrating an embodiment of a receiver and two associated transmitters in the side of a phone_with no touch applied.

FIG. 2A is a diagram illustrating an embodiment of a receiver and two associated transmitters in the side of a phone with no touch applied. In this example, the exemplary phone (202) has multiple interactive surfaces, including the front surface (204) and the side surface (206). For example, having the side of the phone be interactive or touch-sensitive may permit the user to use the side of the phone as a scroll bar or for volume control. Although not shown here, in some embodiments, the other side surface (e.g., opposite to surface 206) is also an interactive surface.

In this example, the transmitters and receivers are configured to exchange an acoustic or ultrasonic signal. Such signals may be desirable because they work well in a variety of propagating mediums, including ones that have not worked well with previous touch and/or force sensing techniques. For example, the sides of some phones are made of metal, which does not work well with existing touch and/or force sensors which rely upon capacitors (e.g., because of the stiffness of the metal and/or the conductive properties of the metal). In contrast, acoustic or ultrasonic signals can propagate through metal relatively easily. In some embodiments, piezoelectric transducers are used for the transmitters and/or receivers.

Diagram 200 shows the system when the side of the phone is not being touched. The side of the phone (206) includes from left to right: a first transmitter (208), a second transmitter (210), and a receiver (212). (To preserve the readability of this diagram, other transmitters and receivers are not shown but naturally additional transmitters and/or receivers may be included.) In diagram 200, the transmitted signals propagate through different paths along the side of the phone. The first signal (214a) travels through a first region (e.g., shown as dotted region 218) between the first transmitter and the receiver. The second signal (216a) travels through a second region (e.g., shown as shaded region 220). Region 218 and region 220 show some examples of a first region and a second region which are referred to in the process of FIG. 1F.

Figure 2B:
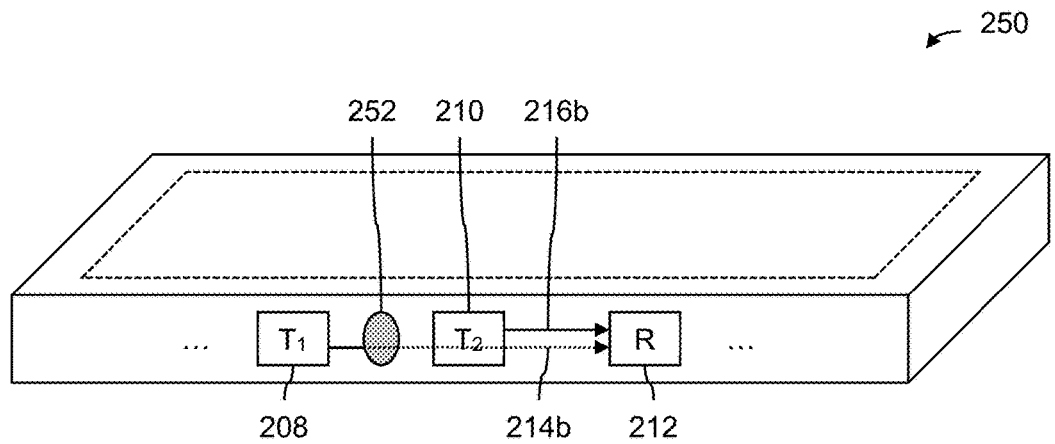
FIG. 2B is a diagram illustrating an embodiment of a receiver and two associated transmitters in the side of a phone with a single touch on the side of a phone.

FIG. 2B is a diagram illustrating an embodiment of a receiver and two associated transmitters in the side of a phone with a single touch on the side of a phone. Diagram 250 shows the phone when a single touch (252) is applied to the side of the phone. For readability, the first region (shown in diagram 200 as dotted region 218) and the second region (shown in diagram 200 as shaded region 220) are not shown in diagram 250. In this example, the touch is located between the first transmitter (208) and the second transmitter (210). This is an example of the touch scenario referred to at step 174 in FIG. 1F.

Touch 252 causes the first signal (214b) to be absorbed to some degree. In this example, the absorption is observable in the amplitude of the signal where the amplitude of a signal where there is no touch is greater than if the signal passed through the touch. In one example of how step 174 in FIG. 1F is performed, a touch input (e.g., corresponding to touch 252) is identified between the first transmitter (208) and the second transmitter (210) if the amplitude of signal 214b decreases compared to some (e.g., first) reference amplitude, but the amplitude of signal 216b remains the same compared to some (e.g., second) reference. To summarize:

TABLE 1

Amplitude change(s) when going from the untouched state shown in diagram 200 in FIG. 2A to the touched state shown in diagram 250 in FIG. 2B.

| First Signal from $T_1$ | Second Signal from $T_2$ | Conclusion |
| --- | --- | --- |
| Amplitude decreases compared to a previous/reference amplitude | Amplitude is the same compared to a previous/reference amplitude | A touch input between $T_1$ and second transmitter is present |

In some embodiments, the term amplitude refers to the absolute value of a peak (e.g., a minimum or maximum) associated with a signal. In some embodiments, the absolute value of the peak is determined after some pre-processing (e.g., to remove less desirable contributions to the received signal).

In some cases, the system may go from the state shown in diagram 250 to the state shown in diagram 200. In one special case, this may occur if the phone is powered on and the system performs an initialization process with touch 252 applied (e.g., as shown in diagram 250) and then the user subsequently removes his/her finger from the interactive surface. Independent of whether that transition occurs during an initialization process:

TABLE 2

Amplitude change(s) when going from the touched state shown in diagram 250 in FIG. 2B to the untouched state shown in diagram 200 in FIG. 2A.

| First Signal from $T_1$ | Second Signal from $T_2$ | Conclusion |
| --- | --- | --- |
| Amplitude increases compared to a previous/reference amplitude | Amplitude is the same compared to a previous/reference amplitude | A touch input between $T_1$ and second transmitter is no longer there |

As the above shows, when a touch sensor detects that the amplitude of the first signal increases and the amplitude of the second signal remains the same (e.g., compared to some reference amplitude(s)), in some embodiments the touch sensor indicates that a touch (e.g., which was present or identified before) is no longer present between the first and second transmitter.

The above table demonstrates a benefit to the sensor embodiments described herein. Some existing touch sensors in phones have problems when the phone is powered on with a user touching an interactive surface. When this occurs and the initialization process of the touch sensor runs, the sensor is initialized with settings or information associated with the phone being touched. This is undesirable because with that initialization, the capacitive touch sensors cannot detect when the phone is no longer being touched and/or complex processes must be performed in order to correct this. In contrast, because there is an observable change in the amplitude of the signal when a touch leaves, it is easier for the sensors described herein to detect when an interactive surface goes from a touched state to an untouched state by looking at the amplitude of the signal(s) (e.g., even if the system initializes in a touched state).

In this example, each transmitter transmits its signal in a manner that is orthogonal to the other transmitters. For example, the first transmitter may use a first pseudo-random binary sequence (PRBS) to transmit its signal and the second transmitter may use a second, different PRBS which creates orthogonality between the transmitters and/or transmitted signals. Such orthogonality permits a processor or sensor coupled to the receiver to filter for or otherwise isolate a desired signal from a desired transmitter.

In some embodiments, the different transmitters use time-shifted versions of the same PRBS. For example, at the receiver, the received signal (e.g., which is a combination of the different transmitted signals from the various transmitters) is correlated against the transmitted signal. Generally speaking, the received signal is correlated against the transmitted one. The signal to transmit is selected for its good auto-correlation properties, that is, auto-correlation must be strong at offset 0 and very low everywhere else. After correlation, the resulting signal has multiple sharp peaks where each peak corresponds to a different transmitter (e.g., because the different starting points or phases of the time-shifted pseudo-random bit sequences result in different offsets or locations of the peaks). For example, in this scenario where there are two transmitters, one peak in the correlated signal corresponds to the signal from the first transmitter and a second peak (e.g., at a different offset or location compared to the first peak) corresponds to the signal from the second transmitter. In some embodiments, using time-shifted versions of the same PRBS is desirable because auto-correlation of a PRBS has a very strong peak at offset 0 and is relatively small everywhere else. The correlation of two different PRBS sequences is not so small. Time shifting the same PRBS for each transmitter provides the lowest correlation between transmitters (at least for a portion of the whole sequence).

In some embodiments, the transmitters use orthogonal codes to create orthogonality between the transmitted signals (e.g., in addition to or as an alternative to creating orthogonality using a PRBS). In various embodiments, any appropriate technique to create orthogonality may be used.

In at least some cases, the system may not be able to detect if two touches occur between the first transmitter (208) and the second transmitter (210). For this reason, in some embodiments, transmitters and receivers are spaced relatively close together, for example, less than the width of an expected touch. In one example, the transmitters and receivers are spaced ~10 mm apart. If the transmitters and receivers are spaced relatively close to each other, then the likelihood of multiple touches occurring between adjacent transmitters and/or receivers is reduced, and/or if multiple touches did occur so close together but were not identified it would be acceptable (e.g., from a user experience point of view).

One benefit to the shared sensor embodiments described herein (e.g., where a given receiver listens for or to multiple transmitters) is that the number of receivers is reduced. For example, in a non-shared receiver layout there is a 1:1 ratio of transmitters and receivers and more receivers would be required (e.g., compared to a shared receiver embodiment) in order to achieve the same density of transmitters and/or receivers. Having more receivers is undesirable because of the routing requirements associated with each receiver. Suppose (for simplicity) there is a single chip which performs touch and/or force sensing. The output from each of the receivers needs to be routed to the sensor chip. Therefore, more receivers require more routing which consumes more space (e.g., on some printed circuit board or within the phone itself in general) and/or costs more money. For this reason, a shared receiver configuration (one example of which is shown here) is attractive.

The following figures describe the above tables more formally in flowcharts.

Figure 3:
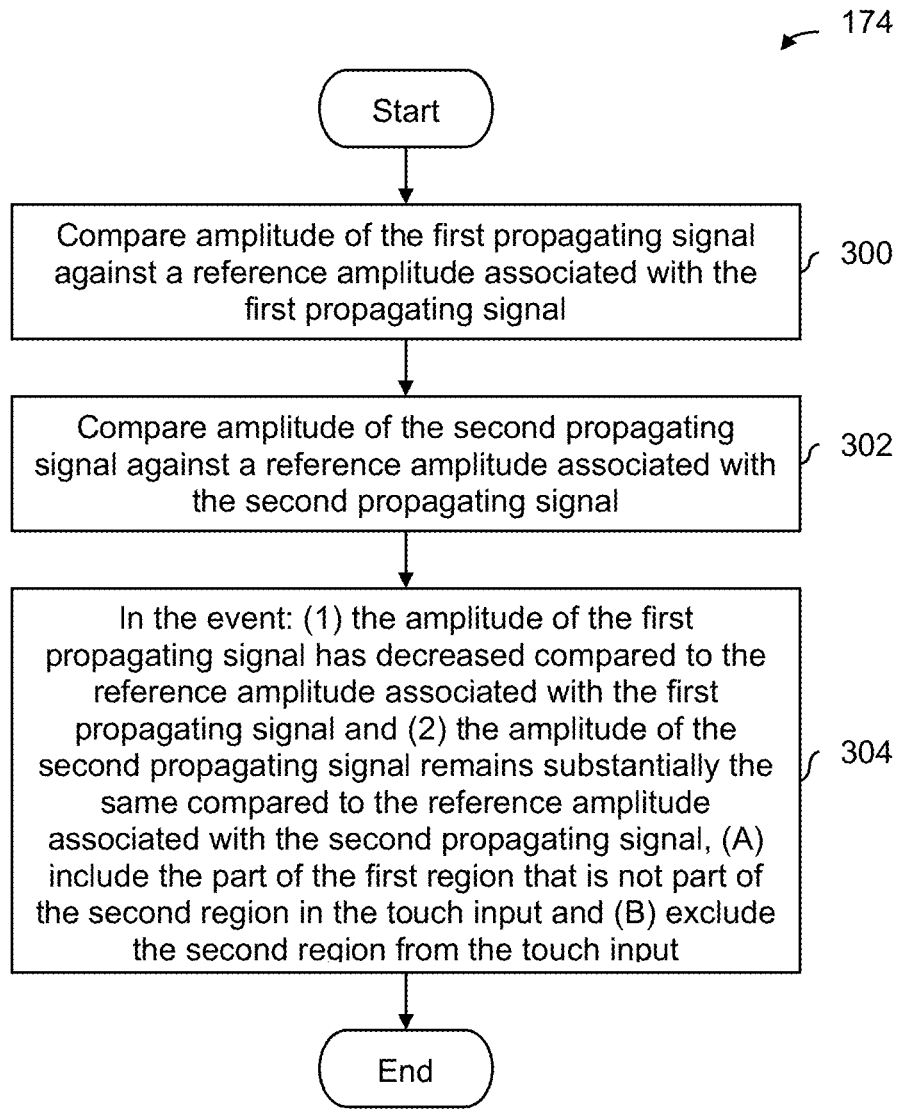
FIG. 3 is a flowchart illustrating an embodiment of a process to identify a touch input in a part of a first region that is not part of a second region using signal amplitudes.

FIG. 3 is a flowchart illustrating an embodiment of a process to identify a touch input in a part of a first region that is not part of a second region using signal amplitudes. FIG. 3 corresponds to Table 1 and a transition from diagram 200 in FIG. 2A to diagram 250 in FIG. 2B. In some embodiments, the process is used at step 174 in FIG. 1F.

At 300, the amplitude of the first propagating signal is compared against a reference amplitude associated with the first propagating signal. For example, the amplitude of signal 214a in FIG. 2A (e.g., where there is no touch) is an example of a saved and/or reference amplitude of the first propagating signal and signal 214b in FIG. 2B (e.g., where there is a touch) is an example of an (e.g., current) amplitude of the first propagating signal.

At 302, the amplitude of the second propagating signal is compared against a reference amplitude associated with the second propagating signal. For example, the amplitude of signal 216a in FIG. 2A is an example of a saved and/or reference amplitude of the second propagating signal and signal 216b in FIG. 2B is an example of an (e.g., current) amplitude of the second propagating signal.

It is noted that the first signal and the second signal use different references at step 300 and step 302. In some embodiments, this is desirable because it permits different signal paths or parts of the side of a phone (as an example) to have different reference amplitudes. For example, the receivers may be implemented using piezo transducers which are very sensitive to temperature. If there is some localized "hot spot" along the side of the phone, then it would be desirable to have one reference amplitude for signals which pass through the hot spot and a different reference amplitude for signals which do not pass through the hot spot. In other words, using different reference amplitudes may permit the sensor to more accurately detect a touch and/or more accurately estimate a force value. In some embodiments, for each transmitter-receiver pair there is stored a reference signal (e.g., from which the reference amplitude is obtained) or just the reference amplitude itself (e.g., if no other information from the reference signal is desired).

At 304, in the event: (1) the amplitude of the first propagating signal has decreased compared to the reference amplitude associated with the first propagating signal and (2) the amplitude of the second propagating signal remains substantially the same compared to the reference amplitude associated with the second propagating signal, (A) the part of the first region that is not part of the second region is included in the touch input and (B) the second region is excluded from the touch input. For example, touch 252 in FIG. 2B causes the amplitude of the first signal (214a/214b in FIG. 2A and FIG. 2B, respectively) to decrease whereas the amplitude of the second signal (216a/216b in FIG. 2A and FIG. 2B, respectively) does not change. A touch is therefore identified in that part of the first region which is not part of the second region (e.g., between the first transmitter (208) and second transmitter (210)), but the identified touch does not include the second region (e.g., between the second transmitter (210) and the receiver (212)).

Figure 4:
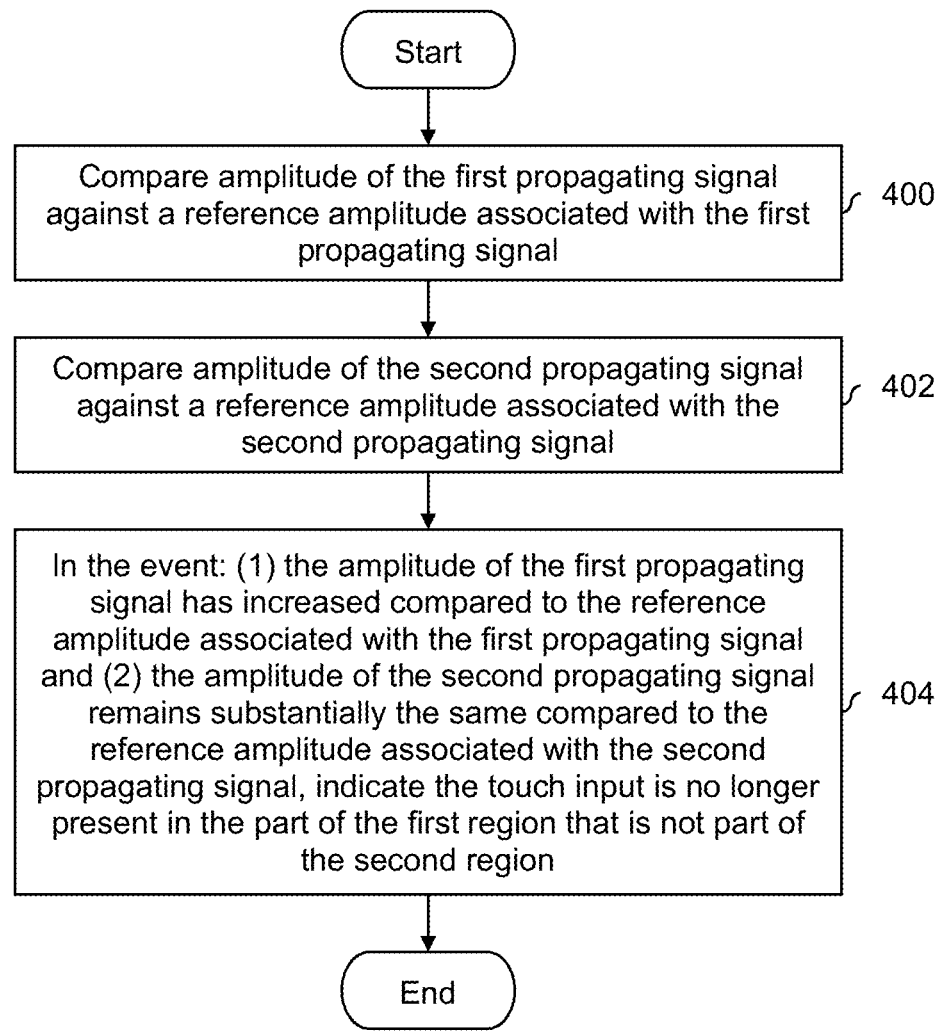
FIG. 4 is a flowchart illustrating an embodiment of a process to identify when a touch input leaves a part of a first region that is not part of a second region using signal amplitudes.

FIG. 4 is a flowchart illustrating an embodiment of a process to identify when a touch input leaves a part of a first region that is not part of a second region using signal amplitudes. FIG. 4 corresponds to Table 2 and a transition from diagram 250 in FIG. 2B to diagram 200 in FIG. 2A. In some embodiments, the process of FIG. 4 is performed in combination with FIG. 1F and/or FIG. 3 (e.g., the process of FIG. 1F and/or FIG. 3 detects when there is a touch and the process of FIG. 4 detects when that touch goes away).

At 400, the amplitude of the first propagating signal is compared against a reference amplitude associated with the first propagating signal. At 402, the amplitude of the second propagating signal is compared against a reference amplitude associated with the second propagating signal.

For example, diagram 250 in FIG. 2B shows an exemplary previous state of the system and diagram 200 in FIG. 2A shows an exemplary current state of the system. The amplitudes associated with the signals in diagram 250 in FIG. 2B are therefore examples of previous and/or reference amplitudes and the amplitudes associated with the signals in diagram 200 in FIG. 2A are examples of (e.g., current) amplitudes.

At 404, in the event: (1) the amplitude of the first propagating signal has increased compared to the reference amplitude associated with the first propagating signal and (2) the amplitude of the second propagating signal remains substantially the same compared to the reference amplitude associated with the second propagating signal, it is indicated the touch input is no longer present in the part of the first region that is not part of the second region. As described above, if the amplitude of the first signal goes up and the amplitude of the second signal remains the same, this is indicative of a touch leaving that part of the first region which does not include the second region (e.g., between the first transmitter (208) and the second transmitter (210) in FIG. 2A and/or FIG. 2B).

The following figure describes using time-shifted versions of the same PRBS more formally in a flowchart.

Figure 5:
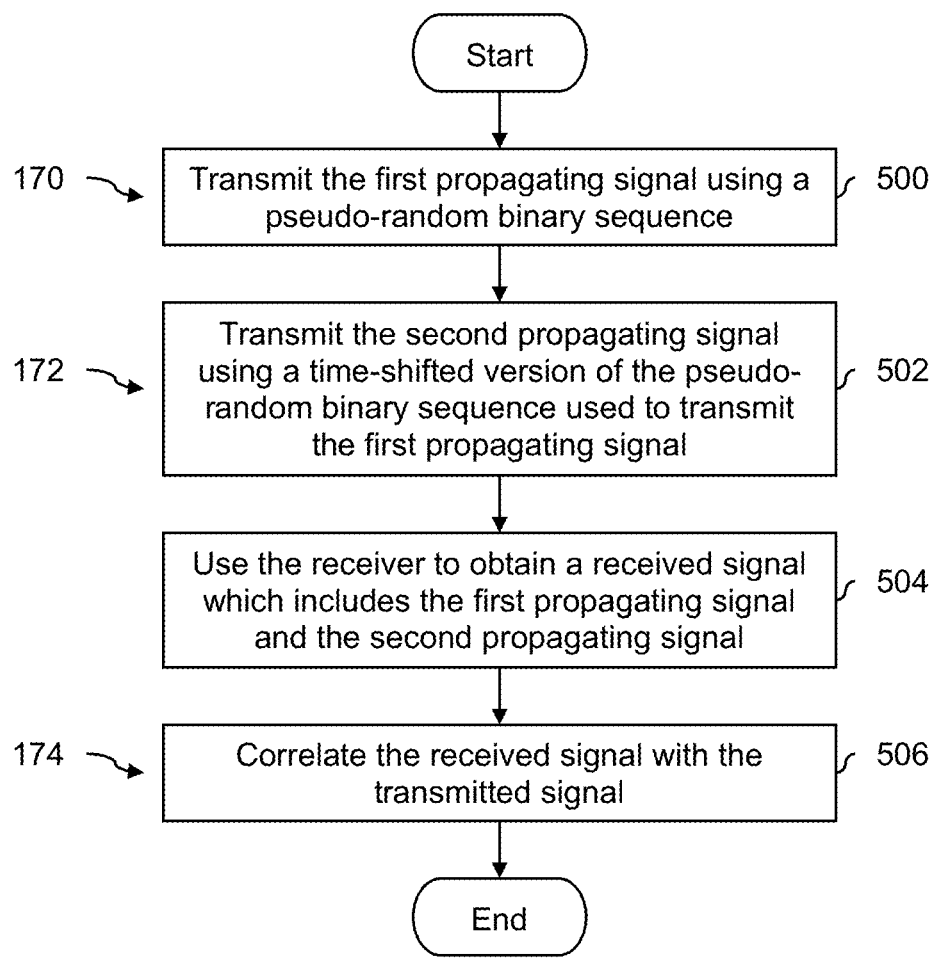
FIG. 5 is a flowchart illustrating an embodiment of a process to use time-shifted versions of the same PRBS when transmitting.

FIG. 5 is a flowchart illustrating an embodiment of a process to use time-shifted versions of the same PRBS when transmitting. At 500, the first propagating signal is transmitted using a pseudo-random binary sequence. In some embodiments, step 170 in FIG. 1F includes step 500.

At 502, the second propagating signal is transmitted using a time-shifted version of the pseudo-random binary sequence used to transmit the first propagating signal. In some embodiments, step 172 in FIG. 1F includes step 500.

At 504, the receiver is used to obtain a received signal which includes the first propagating signal and the second propagating signal.

At 506, the received signal is correlated with the transmitted signal. As described above, the time-shifting causes the first propagating signal and second propagating signal to be separated out in the output of the correlator (e.g., one peak in the correlation signal corresponds to the first propagating signal and another peak in the correlation signal corresponds to the second propagating signal). In some embodiments, step 174 in FIG. 1F includes step 506. In some embodiments, correlation is performed before the (e.g., current or new) amplitude of the signal is compared to some reference amplitude.

The following figure shows a more detailed example of how touch detection and force estimation are performed on the side of a phone with more signals contributing to processing.

Figure 6A:
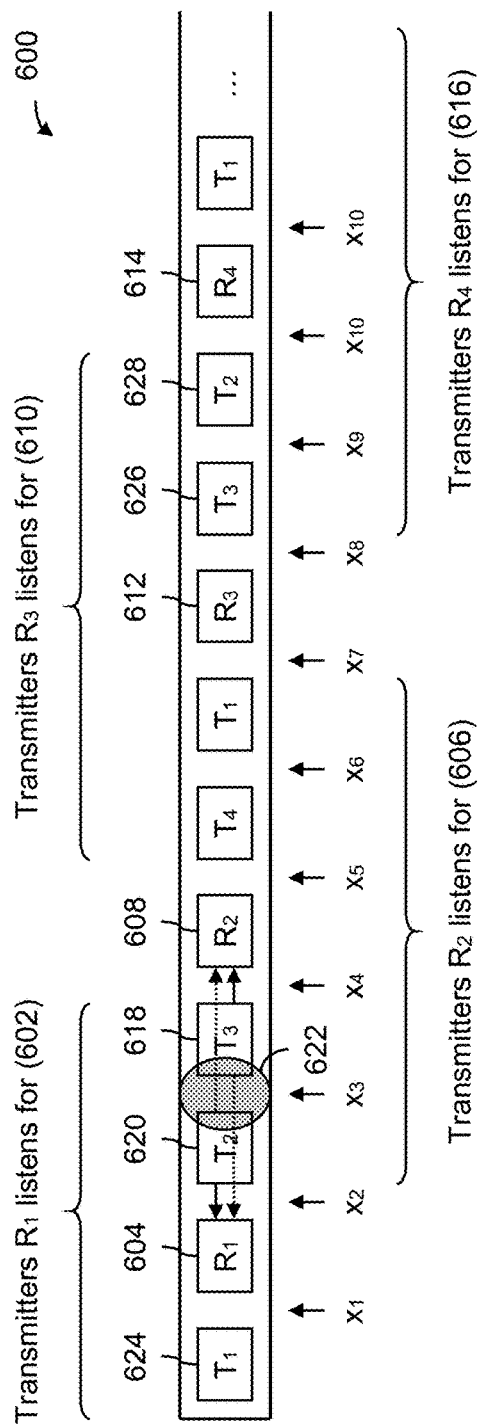
FIG. 6A is a diagram illustrating an embodiment of a side of a phone with multiple transmitters and multiple receivers.

FIG. 6A is a diagram illustrating an embodiment of a side of a phone with multiple transmitters and multiple receivers. Diagram 600 shows the exemplary transmitters and receivers laid out along the side of a phone. In this example, each receiver is associated with and listens to some number of transmitters. Group 602 shows the transmitters that the first receiver (604) listens for, group 606 shows the transmitters that the second receiver (608) listens for, group 610 shows the transmitters that the third receiver (612) listens for, and group 616 shows the transmitters that the fourth receiver (614) listens for.

In this example, transmitters with the same index use the same time-shifted PRBS to transmit their signal. That is, all first transmitters use a PRBS with a first time shift, all second transmitters the same PRBS but with a second time shift, and so on. To ensure that only the appropriate signals from the appropriate transmitters are analyzed downstream, in some embodiments, filtering (e.g., based on propagation time) is performed so that signals from more distant transmitters (e.g., which are not part of a receiver's group) are ignored.

Figure 6B:
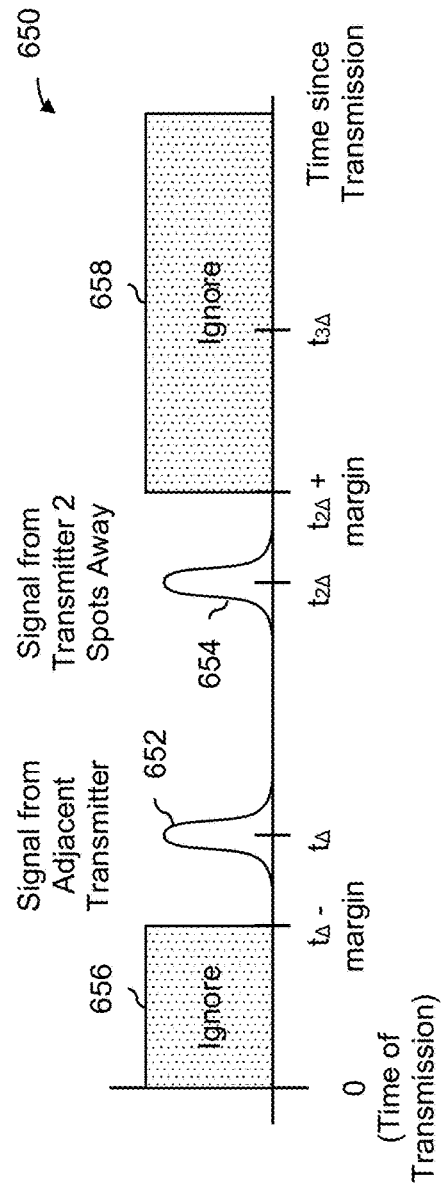
FIG. 6B is a diagram illustrating an embodiment of filtering performed.

FIG. 6B is a diagram illustrating an embodiment of filtering performed. Diagram 650 shows an example of the filtering performed. For clarity and ease of explanation, suppose that all of the transmitters transmit at time 0. The propagation medium and its properties are known ahead of time (e.g., it is known that the side of a phone will be made of metal) and so the propagation time of a signal from a given transmitter to a given receiver is known. As used herein, $t_A$ is the propagation time of a signal from a transmitter to an adjacent receiver (e.g., from $T_3$ (618) to second receiver (608)). Similarly, $t_{2A}$ is the propagation time of a signal from a transmitter to a receiver which is two places or spots away (e.g., from second transmitter (620) to second receiver (608)).

Again for clarity and ease of explanation, the transmission signals (652 and 654) in this example are represented as relatively short pulses; note that they occur or otherwise arrive at time $t_A$ and $t_{2A}$. Given the propagation times described above, the transmission (652) from an adjacent transmitter (e.g., from $T_3$ (618) to second receiver (608)) arrives at the receiver at time $t_A$. The transmission (654) from a transmitter two spots away arrives at the receiver at time $t_{2A}$ (e.g., from second transmitter (620) to second receiver (608)).

As shown in diagram 650, filtering (656) is performed from time 0 to time ($t_A$–margin). Filtering (658) is also performed from time ($t_{2A}$+margin) onwards. This causes any signal received before ($t_A$−margin) or after ($t_{2A}$+margin) to be ignored. As a result, only signals which are receive between $t_A$ (minus some margin) and $t_{2A}$ (plus some margin) are further analyzed and/or processed by downstream processing.

This filtering helps to prevent a transmission from a distant transmitter (e.g., which is not part of a receiver's group) from being analyzed. For example, this filtering may prevent third receiver (612) from passing along (e.g., to a downstream process) the transmitted signal of second transmitter (620), which is not in that receiver's group. It may also prevent a receiver from passing on (e.g., to a downstream process) a reflected signal which is reflected off the edge of the propagation medium. Generally speaking, filtering helps to prevent the introduction of noise which improves the quality of the sensing and/or simplifies the signal processing.

The following figure describes the filtering shown here more formally in a flowchart.

Figure 7:
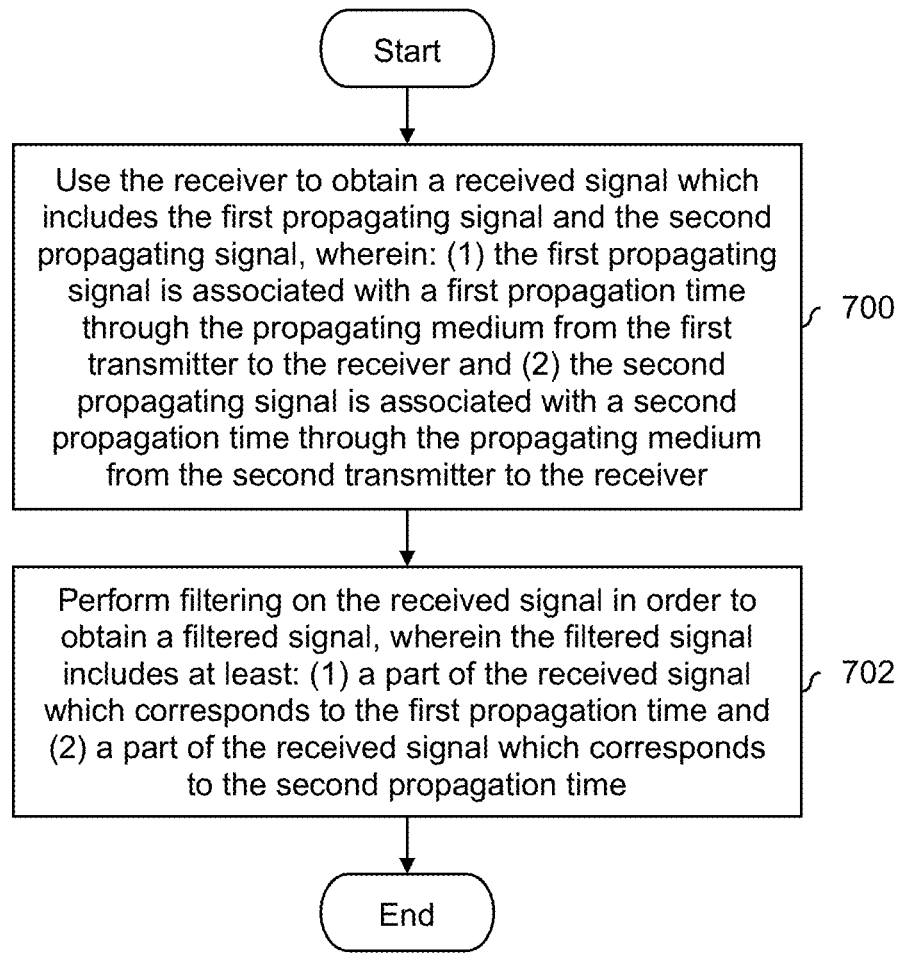
FIG. 7 is a flowchart illustrating an embodiment of a process to filter a received signal.

FIG. 7 is a flowchart illustrating an embodiment of a process to filter a received signal. In some embodiments, the process of FIG. 7 is performed in combination with the process of FIG. 1F. For example, filtering may be performed first before the process of FIG. 1F and the filtered signal is subsequently analyzed (e.g., at step 174 in FIG. 1).

At 700, the receiver is used to obtain a received signal which includes the first propagating signal and the second propagating signal, wherein: (1) the first propagating signal is associated with a first propagation time through the propagating medium from the first transmitter to the receiver and (2) the second propagating signal is associated with a second propagation time through the propagating medium from the second transmitter to the receiver. For example, in FIG. 6A, receiver 608 receives a signal from the second transmitter (620) which takes $t_{2A}$ units of time to propagate through the side of the phone and receives a signal from the third transmitter (618) which takes $t_A$ units of time to propagate through the side of the phone. Note that the received signal (e.g., before filtering) includes reflections from the end of the propagation medium and/or transmissions from transmitters which are not part of that receiver's group.

At 702, filtering is performed on the received signal in order to obtain a filtered signal, wherein the filtered signal includes at least: (1) a part of the received signal which corresponds to the first propagation time and (2) a part of the received signal which corresponds to the second propagation time. See, for example FIG. 6B where parts of the received signal before ($t_A$−margin) and after ($t_{2A}$+margin) are filtered out but the desired transmission signals 652 and 654 are still included after filtering. Any appropriate type of filter may be used.

It is noted that the order of transmitter and receiver indices does not follow the same pattern throughout the sample shown. For example, on the left hand side, the order is $T_2$ (620), $T_3$ (618) whereas in the middle it's $T_3$ (626) and then $T_2$ (628). This is intentional so that (as an example) $R_3$ (612) hears from both a $T_2$ on its left (620) and a $T_2$ on its right (628). To separate them in the correlated signal, the $T_2$ on the left is placed as far as possible from $R_3$. The same logic applies to $R_2$ (608) and the $T_2$ on its left (620) and the $T_2$ on its right (628).

Returning to FIG. 6A, the following describes an example in which a touch is detected and a force value is determined by determining a value or metric for each gap between adjacent transmitters and/or receivers. In this example, touch 622 is detected and a force value is determined for touch 622.

In diagram 600, $x_1$ corresponds to the gap between the first transmitter (624) and the first receiver (604), $x_2$ corresponds to the gap between the first receiver (604) and the second transmitter (620), and so on. In this example, the value calculated for gap $x_1$ is:

$$x_1 = T_1 R_1$$

where (generally speaking) $T_i R_j$ is a metric or value associated with a degree of change (if any) of an (e.g., current or new) amplitude compared to some reference amplitude. More specifically:

$$T_i R_j = 10 \log_{10} \frac{|\text{Amplitude}_{new}|}{|\text{Amplitude}_{reference}|}.$$

In some embodiments, each transmitter-receiver pair has its own amplitude reference value. For example, as described above, there may be some localized hot spot which causes the transmitters and/or receivers in one part of the transmission medium to behave differently than in another part of the transmission medium and this difference should be taken into account when calculating the amplitude metrics.

The following figure shows an example of how the values which are input into the $T_i R_j$ calculation shown above may be obtained.

Figure 8:
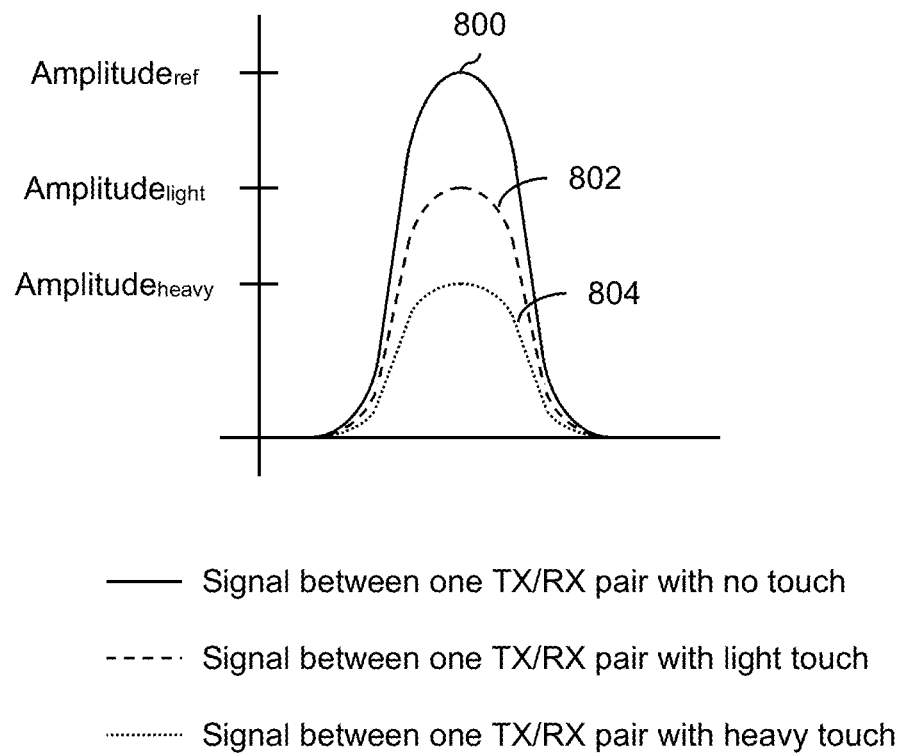
FIG. 8 is a diagram illustrating an embodiment of a signal after passing through different types of touches, if any.

FIG. 8 is a diagram illustrating an embodiment of a signal after passing through different types of touches, if any. In some embodiments, the signals shown are envelopes, where some underlying signal oscillates at a frequency much faster than the frequency with which the envelopes change (e.g., the peaks of the underlying signal define the envelope). In some embodiments, the signals shown are after correlation.

In the example shown, signal 800 is an example of a signal where there is no touch and therefore the signal is not absorbed by the touch. Signal 802, with a lower amplitude than signal 800, corresponds to a signal where there is a light touch which absorbs the signal. Signal 804, with a lower amplitude than signal 802, corresponds to a signal where there is a heavier touch. That is, more force is applied with signal 804 than with signal 802.

As shown here, as more force is applied, the (peak) amplitude of a signal which passes through that touch decreases correspondingly. In the $T_i R_j$ equation above, the amplitude$_{reference}$ input is obtained from the peak (e.g., global maximum or global minimum) value of a reference and/or untouched signal, such as signal 800. For simplicity, the signals shown here are in the positive domain, but a (e.g., global) minima which is in the negative domain would be used after taking the absolute value.

The amplitude$_{new}$ input to the $T_i R_j$ equation above is obtained similarly. For example, if signal 802 were being processed, the value amplitude$_{light}$ would be used and if signal 804 were being processed, the value amplitude$_{heavy}$ would be used. As described above, if the peak of the signal is negative, then taking the absolute value would make it positive.

Returning to FIG. 5, equations for some other gaps are:

$$x_2 = \frac{1}{2}(T_2 R_1 + (T_3 R_1 - (T_2 R_2 - T_3 R_2))) = \frac{1}{2}(T_2 R_1 + T_3 R_1 - T_2 R_2 + T_3 R_2)$$

$$x_3 = \frac{1}{2}((T_2 R_2 - T_3 R_2) + (T_3 R_1 - T_2 R_1))$$

$$x_4 =$$

$$\frac{1}{2}(T_3R_2 + (T_2R_2 - (T_3R_1 - T_2R_1))) = \frac{1}{2}(T_3R_2 + T_2R_2 - T_3R_1 + T_2R_1)$$

$$\vdots$$

where $T_iR_j$ is calculated as described above. These values (i.e., $x_1$, $x_2$, $x_3$, etc.) are sometimes referred to herein as amplitude metrics.

It is noted that the above equations are one example of a way to solve the problem of converting measurements $\{T_iR_j\}$ to segment values $\{x_k\}$. In some embodiments, some other equations are used. For example, different weights can provide other unbiased solutions, perhaps with different statistical variances. For example:

$$x_2 = \frac{3}{4}T_2R_1 + \frac{1}{4}T_3R_1 - \frac{1}{4}T_2R_2 + \frac{1}{4}T_3R_2.$$

It may be useful to discuss the $x_3$ equation in more detail in order to obtain insight into how the $x_2$ and $x_4$ equations are obtained. The two signals which pass through the $x_3$ gap are the $T_2R_2$ signal and the $T_3R_1$ signal. Therefore, it makes sense to use those signals in calculating a metric or value for $x_3$. However, both of those signals are two-gap signals but only the $x_3$ gap is of interest. Therefore, some part of those signals should be discounted or otherwise removed. For the $T_2R_2$ signal, this can be done by subtracting out $T_3R_2$, since that signal is a one-gap signal and exactly matches the part of the $T_2R_2$ signal which is trying to be removed or discounted. This produces the $(T_2R_2-T_3R_2)$ part of the $x_3$ equation above. Similarly, the $T_2R_1$ signal exactly matches the part of the $T_3R_1$ signal which is trying to be removed or discounted, and $T_2R_1$ can be subtracted from $T_3R_1$. This produces the $(T_3R_1-T_2R_1)$ part of the $x_3$ equation above.

The $x_3$ equation above also has a scaling factor of ½. This is to normalize $x_3$ to match the $x_1$ which only has a contribution from a single transmitter receiver pair. To put it another way, without the scaling factor, the $x_1$ and $x_3$ calculations would have different dynamic ranges. Conceptually, two one-gap signals are being added together in the $x_3$ equation, where $(T_2R_2-T_3R_2)$ comprises one of the one-gap signals and $(T_3R_1-T_2R_1)$ comprises the other one-gap signal. In contrast, the x1 equation only has a contribution from one one-gap signal.

This logic may be used to construct the $x_2$ and $x_4$ equations above. For the $x_2$ gap, the two signals which pass through that gap are the $T_2R_1$ signal and the $T_3R_1$. The former signal is a one-gap signal and therefore may be used as-is. However, the $T_3R_1$ signal is a two-gap signal and part of it must be subtracted out. The $T_2R_2$ signal is close, but it is not perfect because it is itself a two-gap signal. However, if the $T_3R_2$ signal is subtracted from $T_2R_2$, then that difference (i.e., $T_2R_2-T_3R_2$) may be subtracted from $T_3R_1$. This produces the $T_3R_1-(T_2R_2-T_3R_2)$ part of the $x_2$ equation. For the reasons described above, the $x_2$ equation includes a ½ scaling factor. The $x_4$ equation can be constructed in a similar manner.

With an amplitude metric calculated for each gap as described above (e.g., $x_1$, $x_2$, $x_3$, etc.), a discrete signal is constructed which is used to both identify touches and output a force value for each identified touch. The following figure illustrates an example of such a signal.

Figure 9A:
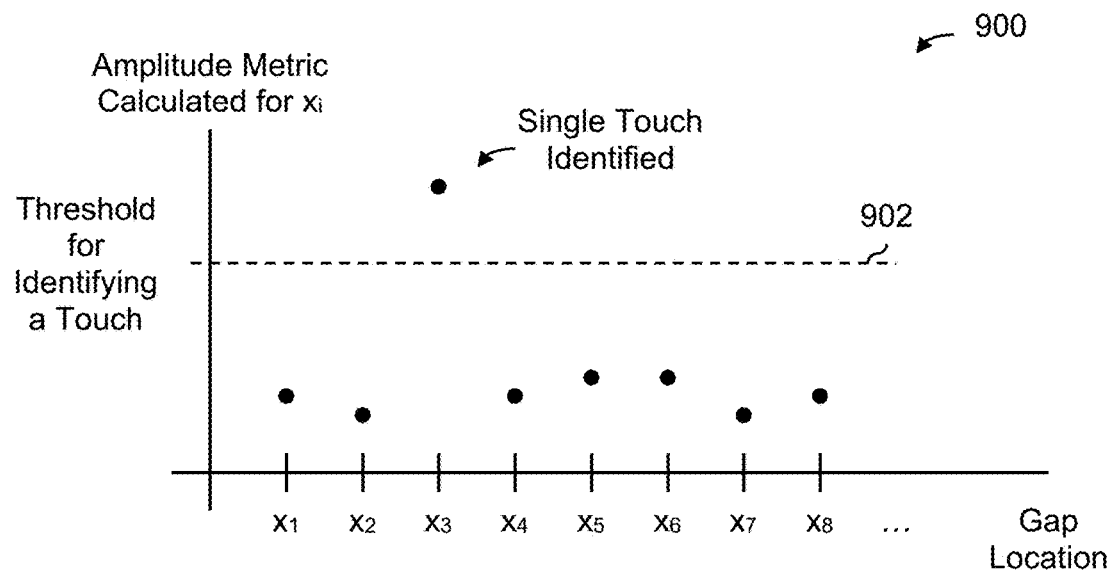
FIG. 9A is a diagram illustrating an embodiment of a discrete signal constructed using amplitude metrics.

FIG. 9A is a diagram illustrating an embodiment of a discrete signal constructed using amplitude metrics. In the example shown, diagram 900 shows a discrete signal generated for the example of FIG. 6A. The amplitude metric for each gap is plotted in this diagram, so that the x-axis corresponds to a particular gap location and the y-axis corresponds to the value or amplitude metric calculated for that particular gap, as described above.

A threshold (902) is used to identify any touches. In this example, the only gap location which has an amplitude metric greater than threshold 902 is the $x_3$ gap. As such, a single touch at the $x_3$ gap is identified. The force value which is output for this identified touch is the amplitude metric calculated for $x_3$. In some embodiments, if gaps are sufficiently small compared to the size of the touch objects (e.g., a finger), the location of the touch may be interpolated on a sub-gap scale by weighting the location of each gap by its amplitude metric.

Figure 9B:
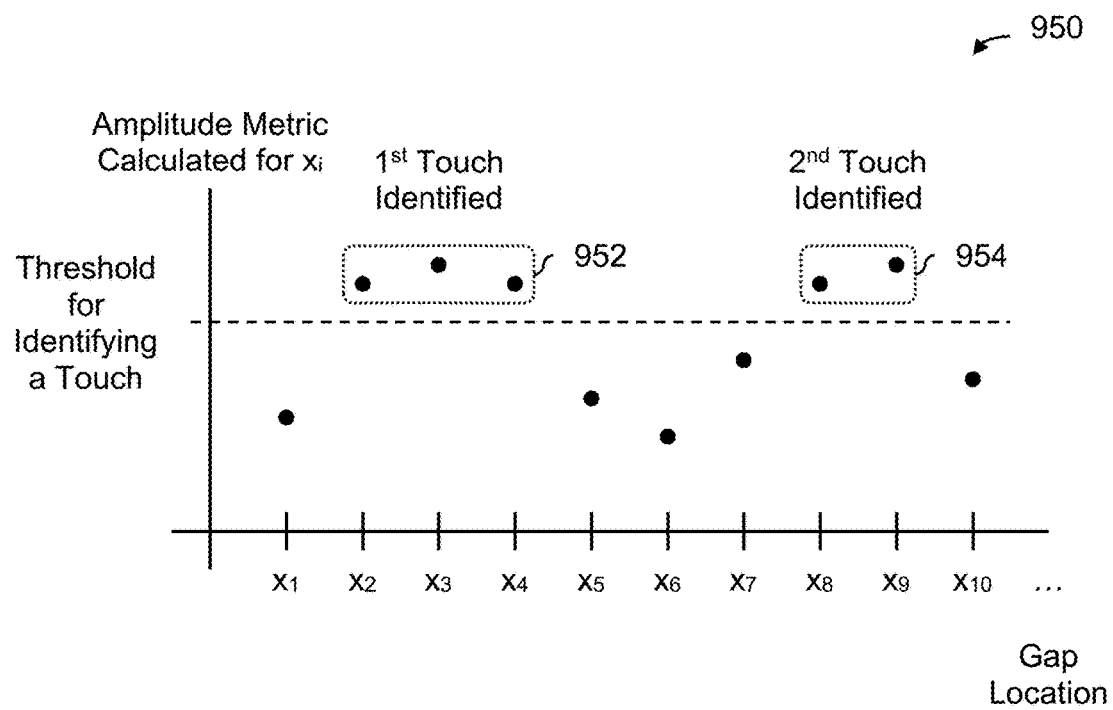
FIG. 9B is a diagram illustrating an embodiment where two touches are identified.

FIG. 9B is a diagram illustrating an embodiment where two touches are identified. Diagram 950 shows another scenario where two touches are identified. As described above, the amplitude metrics for the gaps between transmitters and/or receivers are calculated and plotted. In this example, two touches are identified: a first touch (952) at the $x_2$, $x_3$, and $x_4$ gaps and a second touch (954) at the $x_8$ and $x_9$ gaps. In this example, the largest amplitude metric for each touch is output as the force value for that touch. This means outputting the value calculated for $x_3$ as the force value for the first touch and outputting the value for $x_9$ as the force value for the second touch. In some embodiments, the sum of the values above the threshold is output as the force of the touch.

The following figures describe these processes of generating amplitude metrics and comparing the amplitude metrics against a threshold more formally in flowcharts.

Figure 10:
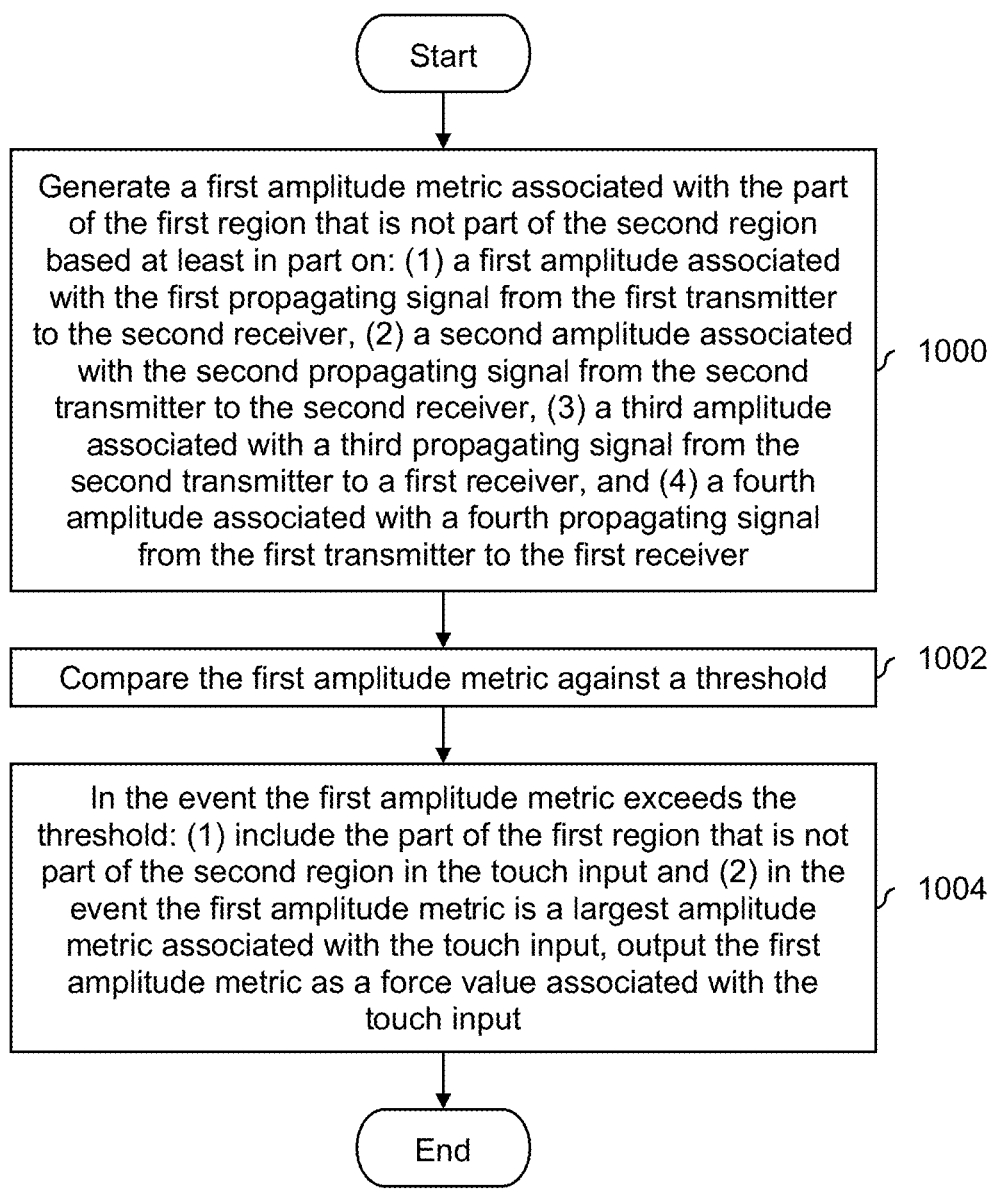
FIG. 10 is a flowchart illustrating an embodiment of a process to identify a touch input using a first amplitude metric associated with the part of the first region that is not part of the second region.

FIG. 10 is a flowchart illustrating an embodiment of a process to identify a touch input using a first amplitude metric associated with the part of the first region that is not part of the second region. In some embodiments, the process of FIG. 10 is used at step 174 in FIG. 1F. It is noted that the receiver referred to in FIG. 1F is referred to in this process as a second receiver.

At 1000, a first amplitude metric associated with the part of the first region that is not part of the second region is generated based at least in part on: (1) a first amplitude associated with the first propagating signal from the first transmitter to the second receiver, (2) a second amplitude associated with the second propagating signal from the second transmitter to the second receiver, (3) a third amplitude associated with a third propagating signal from the second transmitter to a first receiver, and (4) a fourth amplitude associated with a fourth propagating signal from the first transmitter to the first receiver. In one example of step 1000, $$x_3 = \frac{1}{2}((T_2R_2 - T_3R_2) + (T_3R_1 - T_2R_1)).$$

It is noted that the indexes of the transmitters recited in this flowchart do not match the indexes of the transmitters in the $x_i$ equations above, nor the indexes of the transmitters in FIG. 6A.

At 1002, the first amplitude metric is compared against a threshold. At 1004, in the event the first amplitude metric exceeds the threshold: (1) the part of the first region that is not part of the second region is included in the touch input and (2) in the event the first amplitude metric is a largest amplitude metric associated with the touch input, the first amplitude metric is output as a force value associated with the touch input. See, for example, diagram 900 in FIG. 9A. It is noted that an identified touch input may span or include more than one gap, and other gaps may be included in the identified touch input.

Figure 11:
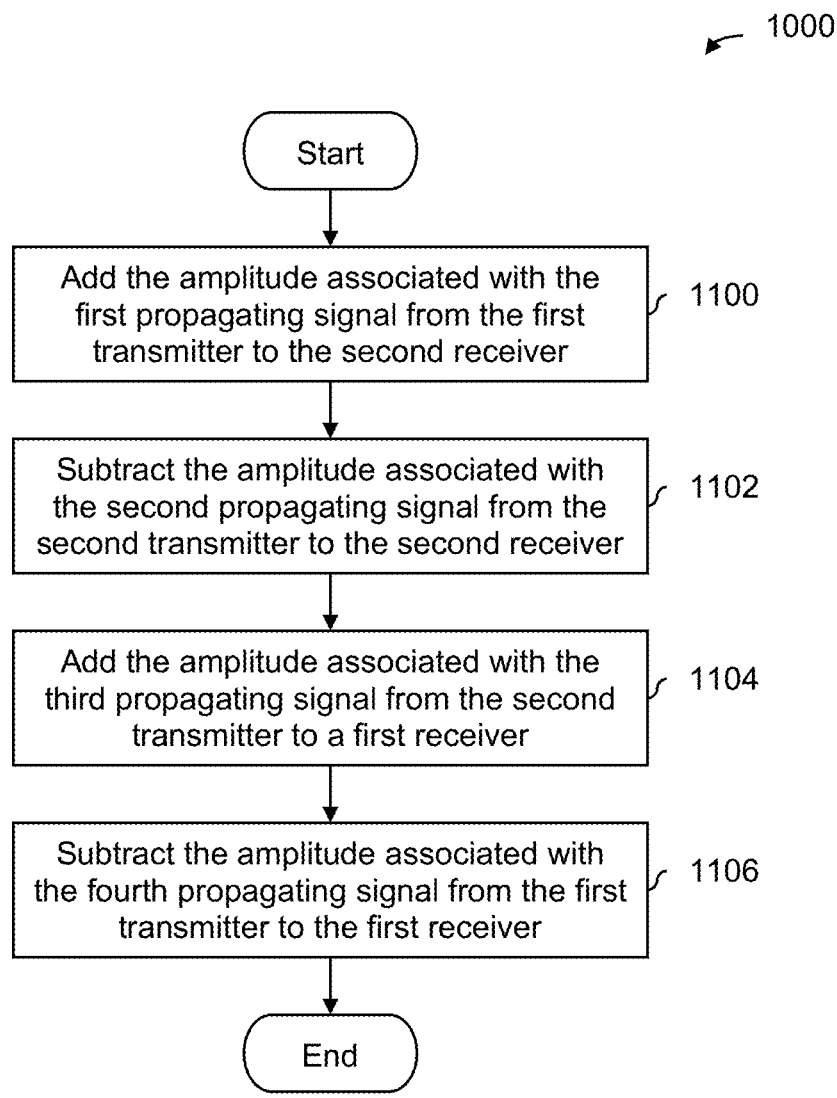
FIG. 11 is a flowchart illustrating an embodiment of a process to generate a first amplitude metric associated with a part of a first region that is not part of a second region.

FIG. 11 is a flowchart illustrating an embodiment of a process to generate a first amplitude metric associated with a part of a first region that is not part of a second region. In some embodiments, the process of FIG. 11 is used at step 1000 in FIG. 10.

At 1100, the amplitude associated with the first propagating signal from the first transmitter to the second receiver is added. See, for example, the first term from the $x_3$ equation above where $T_2R_2$ is added (the transmitter/receiver numbering in the $x_3$ equation do not necessarily match those recited by FIG. 11).

At 1102, the amplitude associated with the second propagating signal from the second transmitter to the second receiver is subtracted. See, for example, the second term from the $x_3$ equation above where $T_3R_2$ is subtracted (the transmitter/receiver numbering in the $x_3$ equation do not necessarily match those recited by FIG. 11).

At 1104, the amplitude associated with the third propagating signal from the second transmitter to a first receiver is added. See, for example, the third term from the $x_3$ equation above where $T_3R_1$ is added (the transmitter/receiver numbering in the $x_3$ equation do not necessarily match those recited by FIG. 11).

At 1106, the amplitude associated with the fourth propagating signal from the first transmitter to the first receiver is subtracted. See, for example, the fourth term from the $x_3$ equation above where $T_2R_1$ is subtracted (the transmitter/receiver numbering in the $x_3$ equation do not necessarily match those recited by FIG. 11).

In some embodiments, a scaling factor is applied to the inputs or terms added/subtracted above. In some other embodiments, the amplitude metric associated with a different gap location is adjusted (e.g., the amplitude metric associated with $x_1$ is multiplied by 2).

Figure 12:
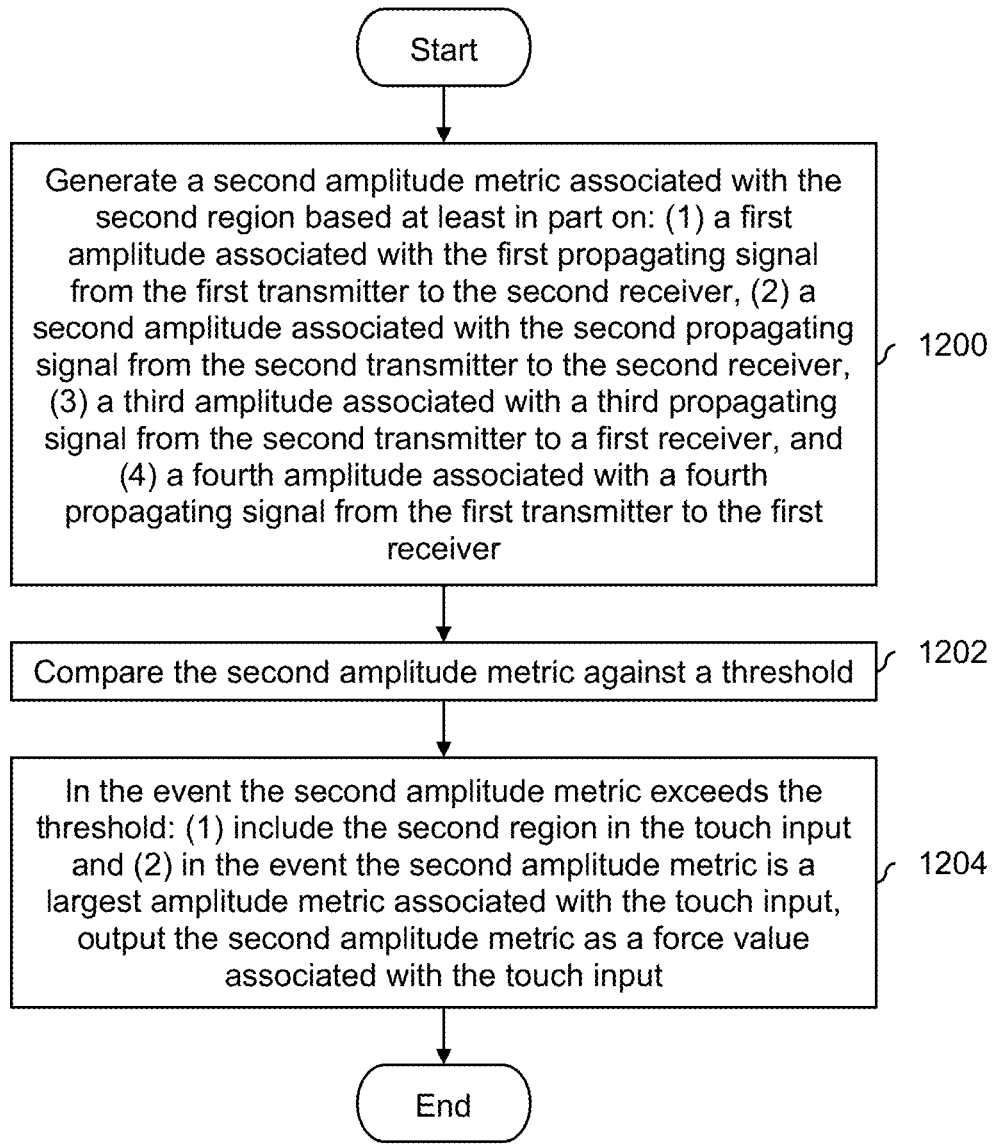
FIG. 12 is a flowchart illustrating an embodiment of a process to identify a touch input using a second amplitude metric associated with the second region.

FIG. 12 is a flowchart illustrating an embodiment of a process to identify a touch input using a second amplitude metric associated with the second region. In some embodiments, this process is performed in addition to the process of FIG. 1F.

At 1200, a second amplitude metric associated with the second region is generated based at least in part on: (1) a first amplitude associated with the first propagating signal from the first transmitter to the second receiver, (2) a second amplitude associated with the second propagating signal from the second transmitter to the second receiver, (3) a third amplitude associated with a third propagating signal from the second transmitter to a first receiver, and (4) a fourth amplitude associated with a fourth propagating signal from the first transmitter to the first receiver. See, for example, the $x_4$ equation described above.

At 1202, the second amplitude metric is compared against a threshold. At 1204, in the event the second amplitude metric exceeds the threshold: (1) the second region is included in the touch input and (2) in the event the second amplitude metric is a largest amplitude metric associated with the touch input, the second amplitude metric is output as a force value associated with the touch input. See, for example, identified touch 952 in FIG. 9B. In that example, the amplitude metric calculated for $x_4$ is not the largest in identified touch 952, so it would not be output as the force value for that identified touch.

Figure 13:
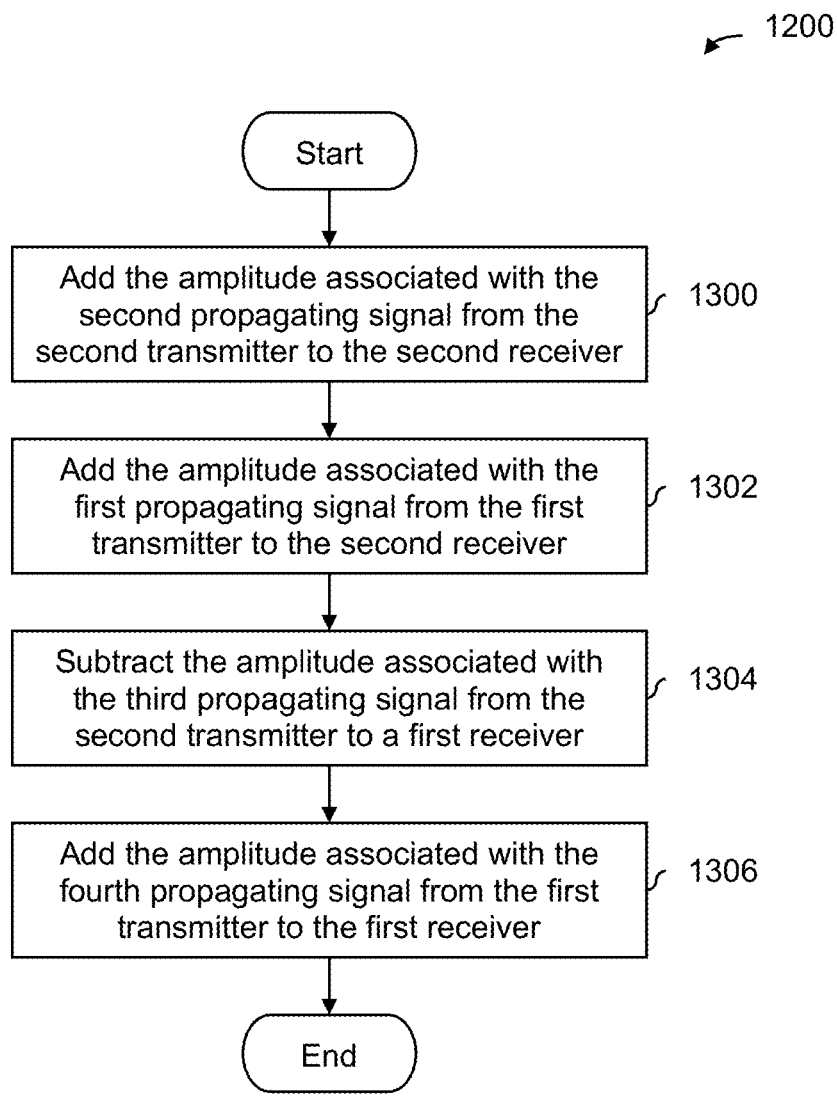
FIG. 13 is a flowchart illustrating an embodiment of a process to generate a second amplitude metric associated with a second region.

FIG. 13 is a flowchart illustrating an embodiment of a process to generate a second amplitude metric associated with a second region. In some embodiments, step 1200 in FIG. 12 includes the process of FIG. 13. As described above, a scaling factor may be applied to this amplitude metric or some other amplitude metric may be scaled (e.g., the amplitude metric for $x_1$).

At 1300, the amplitude associated with the second propagating signal from the second transmitter to the second receiver is added. See, for example, the first term in the $x_4$ equation above where $T_3R_2$ is added (the transmitter/receiver numbering in the $x_3$ equation do not necessarily match those recited by FIG. 13).

At 1302, the amplitude associated with the first propagating signal from the first transmitter to the second receiver is added. See, for example, the second term in the $x_4$ equation above where $T_2R_2$ is added (the transmitter/receiver numbering in the $x_3$ equation do not necessarily match those recited by FIG. 13).

At 1304, the amplitude associated with the third propagating signal from the second transmitter to a first receiver is subtracted. See, for example, the third term in the $x_4$ equation above where $T_3R_1$ is subtracted (the transmitter/receiver numbering in the $x_3$ equation do not necessarily match those recited by FIG. 13).

At 1306, the amplitude associated with the fourth propagating signal from the first transmitter to the first receiver is added. See, for example, the fourth term in the $x_4$ equation above where $T_2R_1$. is added (the transmitter/receiver numbering in the $x_3$ equation do not necessarily match those recited by FIG. 13).

Figure 14:
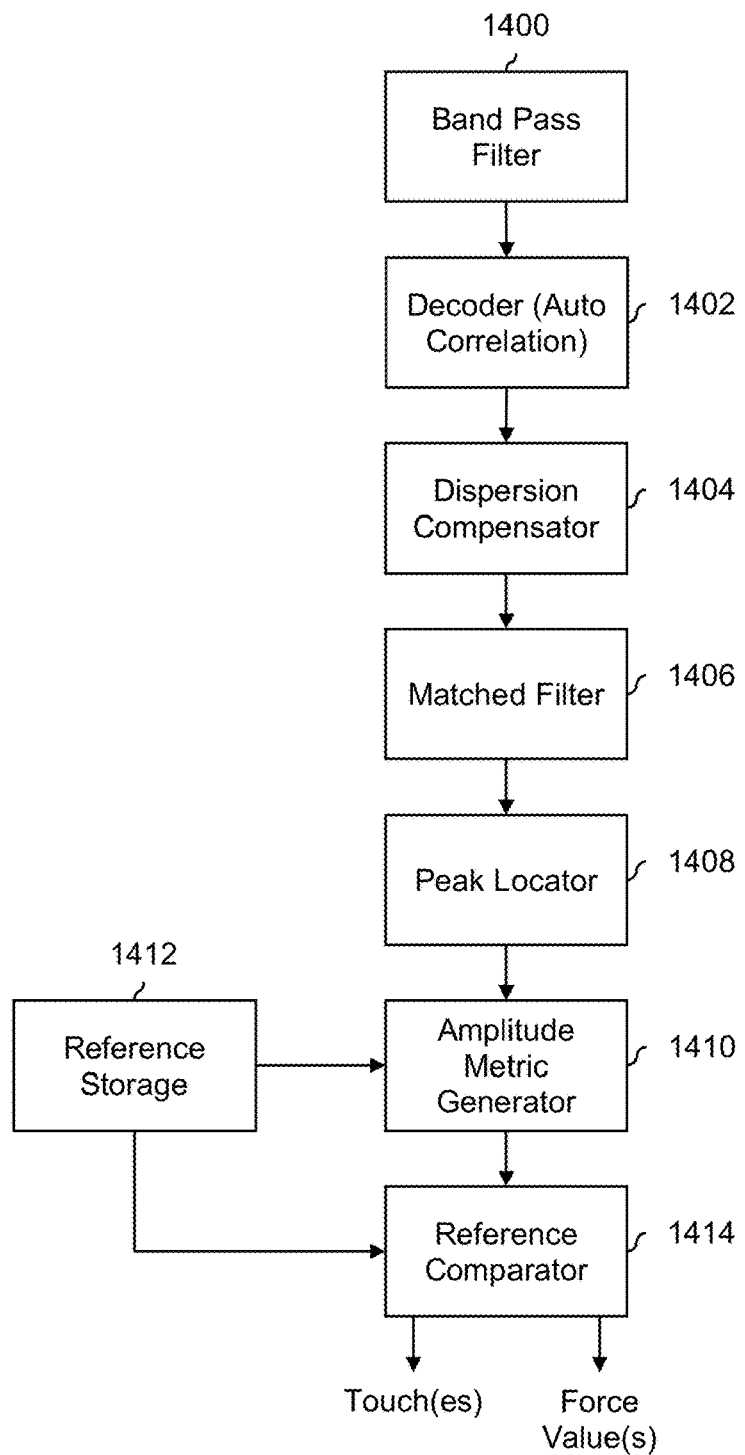
FIG. 14 is a block diagram illustrating an embodiment of a touch and force sensor.

FIG. 14 is a block diagram illustrating an embodiment of a touch and force sensor. For brevity and readability, some components, such as an analog-to-digital converter and transformers to change the signal from time-domain to frequency-domain (or vice versa), are not shown here. Among other things, these exemplary components show some of the pre-processing performed before the amplitude of a signal is used to detect a touch and/or estimate an amount of force. In some embodiments, the exemplary blocks shown are implemented on a touch and force sensor and/or on a processor (e.g., an FPGA, an ASIC, or a general purpose processor).

Band pass filter 1400 is used to filter out information outside of some band pass range. For example, the transmitter may transmit information in some pre-defined range of (e.g., carrier and/or code) frequencies. At the receiver, any signal outside of this range is filtered out in order to reduce the amount of noise or error.

Next, decoding (1402) is performed. As described above, time-shifted versions of the same PRBS are used by the different transmitter indexes (e.g., $T_1$, $T_2$, etc.) to create orthogonality between the different transmitters and/or transmitted signals. Decoding in this example includes performing a correction with the transmitted signal. In FIG. 6A, if the signal received by the second receiver (608) is decoded, performing an correlation will produce four distinct peaks: one corresponding to the second transmitter (620), another corresponding to the third transmitter (618), and so on.

With ultrasonic signals, different frequencies travel through the medium at different speeds. So, at the receiver, higher frequencies arrive before slower frequencies, which results in a "smeared" signal at the receiver. The dispersion compensator (1404) compensates for this so higher frequencies and lower frequencies which left the transmitter at the same time but arrived at different times are aligned again after compensation.

The peaks (e.g., after decoding and dispersion compensation) are expected to have a certain curved shape. Matched filter 1406 filters out parts of the peaks outside of this ideal curved shape, again to reduce noise or errors.

Peak locator 1408 finds the location of the peaks in the signal. For example, if there are four known peaks, then the locations or offsets of the peaks in the signals may be identified. The locations or offsets of the peaks are then passed to amplitude metric generator (1410), which takes the absolute value of the signal at those locations or offsets and then uses the absolute values to generate an amplitude metric for each gap (e.g., $x_1$, $x_2$, $x_3$, etc.) as described above. As described above, amplitude metric generator 1410 inputs the appropriate amplitude references from reference storage 1412 in order to generate the amplitude metrics. The amplitude references stored in reference storage 1412 may be updated as appropriate.

The amplitude metrics (e.g., $x_1$, $x_2$, $x_3$, etc.) are passed from amplitude metric generator 1410 to reference comparator 1414. Reference comparator compares the amplitude metrics against a threshold (see, e.g., FIG. 9A and/or FIG. 9B) and identifies touches when/where the amplitude metric(s) exceed the threshold. The threshold used in the comparison is stored in reference storage 1412 and may be updated as appropriate. The identified touches and corresponding force values are output by reference comparator 1414.

Figure 15:
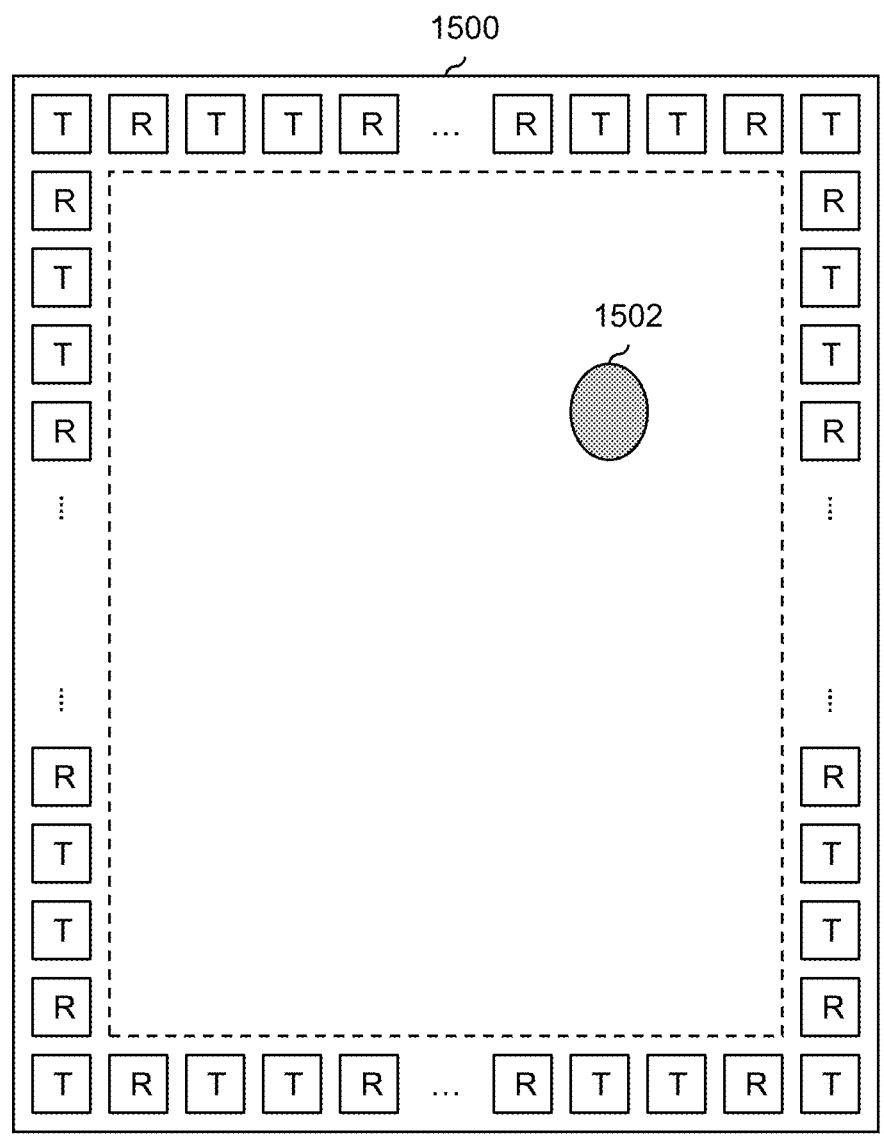
FIG. 15 is a diagram illustrating an embodiment of a two-dimensional interactive surface.

FIG. 15 is a diagram illustrating an embodiment of a two-dimensional interactive surface. In the example shown, surface 1500 shows a two-dimensional surface where shared receivers are used to detect exemplary touch 1502 and/or a force value for touch 1502. To put it another way, the techniques described above are not limited to one-dimensional surfaces. In some embodiments, to simplify the analysis, the degree of uniqueness for each transmitter is increased compared to the one-dimensional examples above. For example, each transmitter may be globally unique so that each transmitter is orthogonal to every other transmitter (e.g., using some combination of orthogonal codes and/or orthogonal PRBS).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first transmitter and a second transmitter coupled to a propagating medium;
a first receiver and a second receiver coupled to the propagating medium, wherein:
the first transmitter transmits a first propagating signal to the first receiver through a first region of the propagating medium;
the first transmitter transmits a second propagating signal to the second receiver through a second region of the propagating medium;
the second transmitter transmits a third propagating signal to the first receiver through a third region of the propagating medium;
the second transmitter transmits a fourth propagating signal to the second receiver through a fourth region of the propagating medium;
the first region is a subset of the third region; and
the fourth region is a subset of the second region; and
a processor configured to identify a touch input to the propagating medium based on one or more of the following: (1) a determination that the third propagating signal was interfered with while the first propagating signal was not interfered with or (2) a determination that the second propagating signal was interfered with while the fourth propagating signal was not interfered with, wherein an output device in the system updates in response to the touch input to the propagating medium being identified by the processor.

2. The system of claim 1, wherein one or more of the following includes a piezoelectric transducer: the first transmitter, the second transmitter, the first receiver, or the second receiver.

3. The system of claim 1, wherein one or more of the following includes an ultrasonic signal: the first propagating signal, the second propagating signal, the third propagating signal, or the fourth propagating signal.

4. The system of claim 1, wherein:
the propagating medium is a one-dimensional propagating medium; and
the first transmitter, the second transmitter, the first receiver, and the second receiver are arranged in a line in the one-dimensional propagating medium.

5. The system of claim 1, wherein identifying the touch input includes:
comparing an amplitude of the third propagating signal against a reference amplitude associated with the third propagating signal;
comparing an amplitude of the first propagating signal against a reference amplitude associated with the first propagating signal; and
in the event: (1) the amplitude of the third propagating signal has decreased compared to the reference amplitude associated with the third propagating signal and (2) the amplitude of the first propagating signal remains substantially the same compared to the reference amplitude associated with the first propagating signal:
including the part of the third region that is not part of the first region in a location associated with the touch input; and
excluding the first region from the location associated with the touch input.

6. The system of claim 1, wherein the processor is further configured to:
compare an amplitude of the third propagating signal against a reference amplitude associated with the third propagating signal;
compare an amplitude of the first propagating signal against a reference amplitude associated with the first propagating signal; and
in the event: (1) the amplitude of the third propagating signal has increased compared to the reference amplitude associated with the third propagating signal and (2) the amplitude of the first propagating signal remains substantially the same compared to the reference amplitude associated with the first propagating signal, indicate the touch input is no longer present in the part of the third region that is not part of the first region.

7. The system of claim 1, wherein:
the first transmitter transmits the first propagating signal, including by using a pseudo-random binary sequence;

the second transmitter transmits the third propagating signal, including by using a time-shifted version of the pseudo-random binary sequence used to transmit the first propagating signal so that there is orthogonality between the first propagating signal and the third propagating signal;

the first receiver obtains a received signal which includes the first propagating signal and the third propagating signal; and identifying the touch input includes analyzing at least the first propagating signal and the third propagating signal, including by correlating the received signal with a transmitted signal that includes one or more of the following: the first propagating signal or the third propagating signal.

8. The system of claim 1, wherein:

the first receiver is configured to obtain a received signal which includes the third propagating signal and the first propagating signal, wherein: (1) the third propagating signal is associated with a third propagation time through the propagating medium from the second transmitter to the first receiver and (2) the first propagating signal is associated with a first propagation time through the propagating medium from the first transmitter to the first receiver; and the processor is further configured to perform filtering on the received signal in order to obtain a filtered signal, wherein the filtered signal includes at least: (1) a part of the received signal which corresponds to the third propagation time and (2) a part of the received signal which corresponds to the first propagation time.

9. The system of claim 1, wherein identifying the touch input includes:

generating a third amplitude metric associated with the part of the third region that is not part of the first region based at least in part on: (1) a third amplitude associated with the third propagating signal from the second transmitter to the first receiver, (2) a first amplitude associated with the first propagating signal from the first transmitter to the first receiver, (3) a second amplitude associated with the second propagating signal from the first transmitter to a second receiver, and (4) a fourth amplitude associated with the fourth propagating signal from the second transmitter to the second receiver;

comparing the third amplitude metric against a threshold; and in the event the third amplitude metric exceeds the threshold:
including the part of the third region that is not part of the first region in the touch input; and
in the event the third amplitude metric is a largest amplitude metric associated with the touch input, outputting the third amplitude metric as a force value associated with the touch input.

10. The system of claim 1, wherein identifying the touch input includes:

generating a third amplitude metric associated with the part of the third region that is not part of the first region based at least in part on: (1) a third amplitude associated with the third propagating signal from the second transmitter to the first receiver, (2) a first amplitude associated with the first propagating signal from the first transmitter to the first receiver, (3) a second amplitude associated with the second propagating signal from the first transmitter to a second receiver, and (4) a fourth amplitude associated with the fourth propagating signal from the second transmitter to the second receiver, including by:
adding the third amplitude associated with the third propagating signal from the second transmitter to the first receiver;
subtracting the first amplitude associated with the first propagating signal from the first transmitter to the first receiver;
adding the second amplitude associated with the second propagating signal from the first transmitter to the second receiver; and
subtracting the fourth amplitude associated with the fourth propagating signal from the second transmitter to the second receiver;

comparing the third amplitude metric against a threshold; and in the event the third amplitude metric exceeds the threshold:
including the part of the third region that is not part of the first region in the touch input; and
in the event the third amplitude metric is a largest amplitude metric associated with the touch input, outputting the third amplitude metric as a force value associated with the touch input.

11. The system of claim 1, wherein identifying the touch input includes:

generating a first amplitude metric associated with the part of the third region that is not part of the first region based at least in part on: (1) a third amplitude associated with the third propagating signal from the second transmitter to the first receiver, (2) a first amplitude associated with the first propagating signal from the first transmitter to the first receiver, (3) a second amplitude associated with the second propagating signal from the first transmitter to a second receiver, and (4) a fourth amplitude associated with the fourth propagating signal from the second transmitter to the second receiver;

comparing the first amplitude metric against a threshold; and in the event the first amplitude metric exceeds the threshold:
include the first region in the touch input; and
in the event the first amplitude metric is a largest amplitude metric associated with the touch input, output the first amplitude metric as a force value associated with the touch input.

12. A method, comprising:

using a first transmitter to transmit a first propagating signal to a first receiver through a first region of a propagating medium, wherein the first transmitter, a second transmitter, the first receiver, and a second receiver are coupled to the propagating medium;

using the first transmitter to transmit a second propagating signal to the second receiver through a second region of the propagating medium;

using the second transmitter to transmit a third propagating signal to the first receiver through a third region of the propagating medium;

using the second transmitter to transmit a fourth propagating signal to the second receiver through a fourth region of the propagating medium, wherein: the first region is a subset of the third region and the fourth region is a subset of the second region; and identifying a touch input to the propagating medium based on one or more of the following: (1) a determination that the third propagating signal was interfered with while the first propagating signal was not interfered with or (2) a determination that the second propagating signal was interfered with while the fourth propagating signal was not interfered with, wherein:
    a system includes the first transmitter, the second transmitter, the first receiver, the second receiver, and an output device; and
    the output device in the system updates in response to the touch input to the propagating medium being identified.

13. The method of claim 12, wherein identifying the touch input includes:
    comparing an amplitude of the third propagating signal against a reference amplitude associated with the third propagating signal;
    comparing an amplitude of the first propagating signal against a reference amplitude associated with the first propagating signal; and
    in the event: (1) the amplitude of the third propagating signal has decreased compared to the reference amplitude associated with the third propagating signal and (2) the amplitude of the first propagating signal remains substantially the same compared to the reference amplitude associated with the first propagating signal:
        including the part of the third region that is not part of the first region in a location associated with the touch input; and
        excluding the first region from the location associated with the touch input.

14. The method of claim 12 further comprising:
    compare an amplitude of the third propagating signal against a reference amplitude associated with the third propagating signal;
    compare an amplitude of the first propagating signal against a reference amplitude associated with the first propagating signal; and
    in the event: (1) the amplitude of the third propagating signal has increased compared to the reference amplitude associated with the third propagating signal and (2) the amplitude of the first propagating signal remains substantially the same compared to the reference amplitude associated with the first propagating signal, indicate the touch input is no longer present in the part of the third region that is not part of the first region.

15. The method of claim 12, wherein:
    the first transmitter transmits the first propagating signal, including by using a pseudo-random binary sequence;
    the second transmitter transmits the third propagating signal, including by using a time-shifted version of the pseudo-random binary sequence used to transmit the first propagating signal so that there is orthogonality between the first propagating signal and the third propagating signal;
    the first receiver obtains a received signal which includes the first propagating signal and the third propagating signal; and
    identifying the touch input includes analyzing at least the first propagating signal and the third propagating signal, including by correlating the received signal with a transmitted signal that includes one or more of the following: the first propagating signal or the third propagating signal.

16. The method of claim 12, wherein:
    the first receiver is configured to obtain a received signal which includes the third propagating signal and the first propagating signal, wherein: (1) the third propagating signal is associated with a third propagation time through the propagating medium from the second transmitter to the first receiver and (2) the first propagating signal is associated with a first propagation time through the propagating medium from the first transmitter to the first receiver; and
    the processor is further configured to perform filtering on the received signal in order to obtain a filtered signal, wherein the filtered signal includes at least: (1) a part of the received signal which corresponds to the third propagation time and (2) a part of the received signal which corresponds to the first propagation time.

17. The method of claim 12, wherein identifying the touch input includes:
    generating a third amplitude metric associated with the part of the third region that is not part of the first region based at least in part on: (1) a third amplitude associated with the third propagating signal from the second transmitter to the first receiver, (2) a first amplitude associated with the first propagating signal from the first transmitter to the first receiver, (3) a second amplitude associated with the second propagating signal from the first transmitter to a second receiver, and (4) a fourth amplitude associated with the fourth propagating signal from the second transmitter to the second receiver;
    comparing the third amplitude metric against a threshold; and
    in the event the third amplitude metric exceeds the threshold:
        including the part of the third region that is not part of the first region in the touch input; and
        in the event the third amplitude metric is a largest amplitude metric associated with the touch input, outputting the third amplitude metric as a force value associated with the touch input.

18. The method of claim 12, wherein identifying the touch input includes:
    generating a third amplitude metric associated with the part of the third region that is not part of the first region based at least in part on: (1) a third amplitude associated with the third propagating signal from the second transmitter to the first receiver, (2) a first amplitude associated with the first propagating signal from the first transmitter to the first receiver, (3) a second amplitude associated with the second propagating signal from the first transmitter to a second receiver, and (4) the fourth amplitude associated with a fourth propagating signal from the second transmitter to the second receiver, including by:
        adding the third amplitude associated with the third propagating signal from the second transmitter to the first receiver;
        subtracting the first amplitude associated with the first propagating signal from the first transmitter to the first receiver;
        adding the second amplitude associated with the second propagating signal from the first transmitter to the second receiver; and
        subtracting the fourth amplitude associated with the fourth propagating signal from the second transmitter to the second receiver;
    comparing the third amplitude metric against a threshold; and
    in the event the third amplitude metric exceeds the threshold:

including the part of the third region that is not part of the first region in the touch input; and in the event the third amplitude metric is a largest amplitude metric associated with the touch input, outputting the third amplitude metric as a force value associated with the touch input.

19. The method of claim 12, wherein identifying the touch input includes:

generating a first amplitude metric associated with the part of the third region that is not part of the first region based at least in part on: (1) a third amplitude associated with the third propagating signal from the second transmitter to the first receiver, (2) a first amplitude associated with the first propagating signal from the first transmitter to the first receiver, (3) a second amplitude associated with the second propagating signal from the first transmitter to a second receiver, and (4) a fourth amplitude associated with the fourth propagating signal from the second transmitter to the second receiver;

comparing the first amplitude metric against a threshold; and in the event the first amplitude metric exceeds the threshold:

include the first region in the touch input; and in the event the first amplitude metric is a largest amplitude metric associated with the touch input, output the first amplitude metric as a force value associated with the touch input.

20. A computer program product, the computer program product being embodied in a non-transitory computer readable storage medium and comprising computer instructions for:

using a first transmitter to transmit a first propagating signal to a first receiver through a first region of a propagating medium, wherein the first transmitter, a second transmitter, the first receiver, and a second receiver are coupled to the propagating medium;

using the first transmitter to transmit a second propagating signal to the second receiver through a second region of the propagating medium;

using the second transmitter to transmit a third propagating signal to the first receiver through a third region of the propagating medium;

using the second transmitter to transmit a fourth propagating signal to the second receiver through a fourth region of the propagating medium, wherein: the first region is a subset of the third region and the fourth region is a subset of the second region; and identifying a touch input to the propagating medium based on one or more of the following: (1) a determination that the third propagating signal was interfered with while the first propagating signal was not interfered with or (2) a determination that the second propagating signal was interfered with while the fourth propagating signal was not interfered with, wherein:

a system includes the first transmitter, the second transmitter, the first receiver, the second receiver, and an output device; and the output device in the system updates in response to the touch input to the propagating medium being identified.

* * * * *

UNITED STATES PATENT AND TRADEMARK OFFICE
CERTIFICATE OF CORRECTION

PATENT NO. : 10,509,515 B2
APPLICATION NO. : 16/183992
DATED : December 17, 2019
INVENTOR(S) : Lapoe E. Lynn and Stanislav Maximov Page 1 of 1

It is certified that error appears in the above-identified patent and that said Letters Patent is hereby corrected as shown below:

In the Specification

In Column 1, Line(s) 50, delete "phone_with" and insert --phone with--, therefor.

Signed and Sealed this
Twenty-second Day of December, 2020

Andrei Iancu
*Director of the United States Patent and Trademark Office*